US012248068B2

(12) United States Patent
Iwasawa

(10) Patent No.: US 12,248,068 B2
(45) Date of Patent: Mar. 11, 2025

(54) POSITION DETECTION SYSTEM, POSITION DETECTION METHOD, ANGLE DETECTION METHOD, AND MARKER

(71) Applicant: 3M INNOVATIVE PROPERTIES COMPANY, St. Paul, MN (US)

(72) Inventor: Masaru Iwasawa, Kanagawa (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 944 days.

(21) Appl. No.: 17/297,328

(22) PCT Filed: Nov. 25, 2019

(86) PCT No.: PCT/IB2019/060133
§ 371 (c)(1),
(2) Date: May 26, 2021

(87) PCT Pub. No.: WO2020/121092
PCT Pub. Date: Jun. 18, 2020

(65) Prior Publication Data
US 2022/0075065 A1 Mar. 10, 2022

(30) Foreign Application Priority Data
Dec. 11, 2018 (JP) .................................. 2018-231694

(51) Int. Cl.
*G01S 17/42* (2006.01)
*G01S 7/48* (2006.01)
(Continued)

(52) U.S. Cl.
CPC ............ *G01S 17/42* (2013.01); *G01S 7/4808* (2013.01); *G01S 7/481* (2013.01); *G01S 17/89* (2013.01); *G02B 5/12* (2013.01)

(58) Field of Classification Search
CPC ........ G01S 17/42; G01S 7/4808; G01S 7/481; G01S 17/89; G01S 17/06; G02B 5/12; G02B 5/126
(Continued)

(56) References Cited

U.S. PATENT DOCUMENTS 6,181,271 B1    1/2001   Hosaka
9,933,521 B2    4/2018   Riley
(Continued)

FOREIGN PATENT DOCUMENTS

JP    2002188917 A    7/2002
JP    2005078383 A    3/2005
(Continued)

OTHER PUBLICATIONS

International Search Report for PCT International Application No. PCT/IB2019/060133, mailed on Feb. 13, 2020, 5 pages.

*Primary Examiner* — Daniel L Murphy
(74) *Attorney, Agent, or Firm* — Jonathan L. Tolstedt

(57) ABSTRACT

To provide a position detection system, a position detection method, an angle detection method, and a marker that enable detection of a position, adjustment of a position, detection of an angle, and the like of a movable body with respect to a stationary body to be easily performed. Means for solving problem: A position detection system is a position detection system for detecting a position N of a movable body moving with respect to a stationary body, the position detection system including a light source provided in one of the stationary body and the movable body, an imaging unit provided in one of the stationary body and the movable body, a marker provided in the other of the stationary body and the movable body, and a position detecting unit configured to detect a position of the movable body with respect to the stationary body based on luminance of an image of the marker acquired by the imaging unit, wherein the marker
(Continued)

includes a reflective layer, and a light control layer provided in the reflective layer, and the light control layer transmits light having an angle of incidence with respect to the main surface being within a predetermined threshold value.

13 Claims, 22 Drawing Sheets

(51) Int. Cl.
    *G01S 7/481*     (2006.01)
    *G01S 17/89*     (2020.01)
    *G02B 5/12*     (2006.01)
    *G01B 5/12*     (2006.01)

(58) Field of Classification Search
    USPC ........................................................ 356/4.01
    See application file for complete search history.

(56) References Cited

U.S. PATENT DOCUMENTS

| | | |
|---|---|---|
| 10,268,208 B1 | 4/2019 | Hopwood Thomas |
| 10,663,630 B2 | 5/2020 | Larson |
| 2006/0215147 A1 | 9/2006 | Scott |
| 2018/0081094 A1 | 3/2018 | Aikin |

FOREIGN PATENT DOCUMENTS

| | | |
|---|---|---|
| JP | 2006-163239 | 6/2006 |
| JP | 2006-266973 | 10/2006 |
| JP | 2016223934 A | 12/2016 |
| JP | 2018-005365 | 1/2018 |
| JP | 2018004420 A | 1/2018 |
| JP | 2018185167 A | 11/2018 |
| WO | WO 1999-021027 | 4/1999 |
| WO | WO 2018-035835 | 3/2018 |
| WO | WO 2018-097841 | 5/2018 |

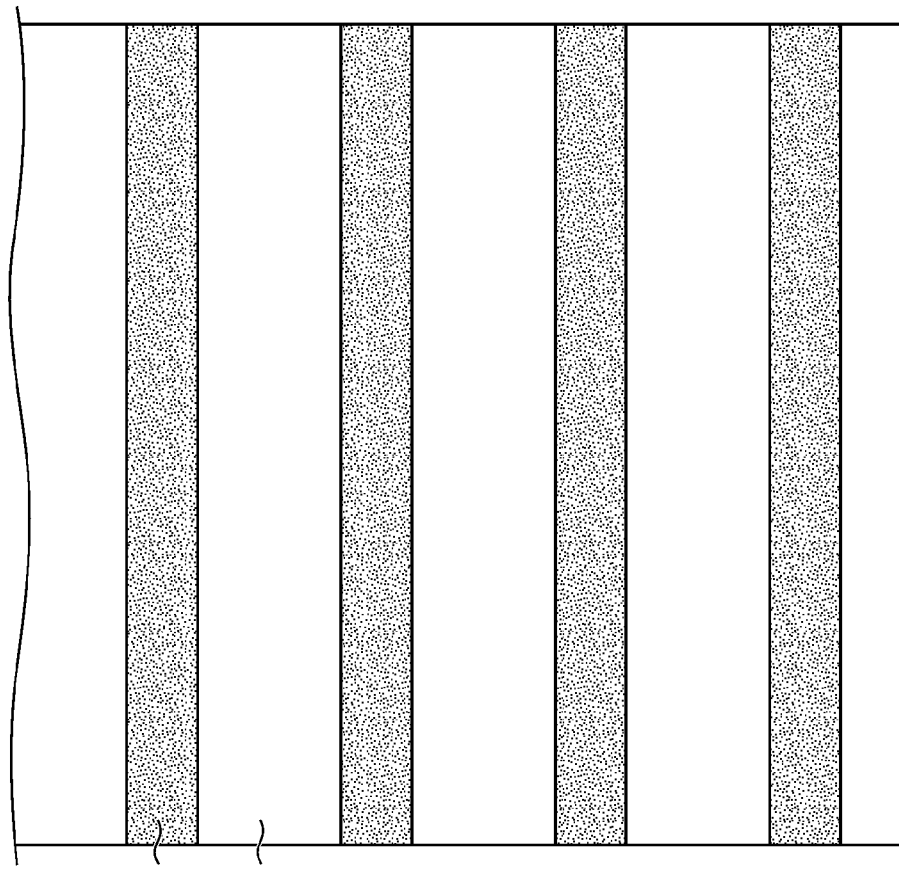
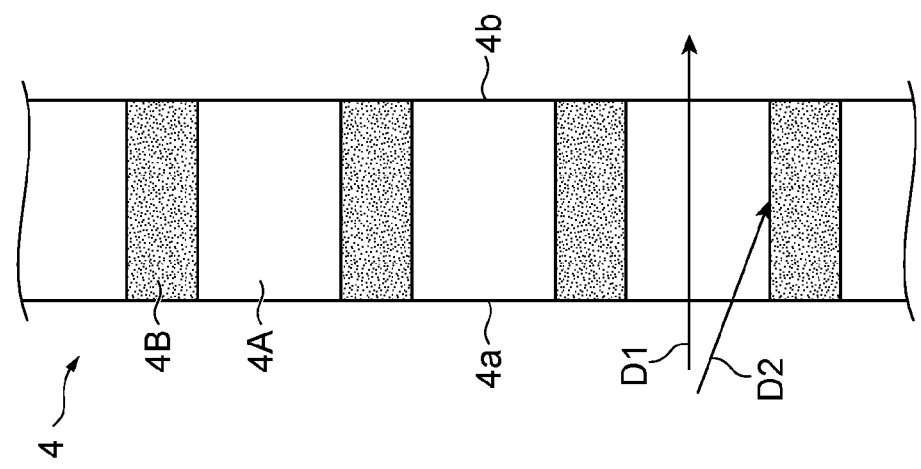
Fig. 5B
Fig. 5a

Fig. 7a DIFFUSE REFLECTION

Fig. 7b SPECULAR REFLECTION

Fig. 7c RETROREFLECTION

POSITION DETECTION SYSTEM, POSITION DETECTION METHOD, ANGLE DETECTION METHOD, AND MARKER

CROSS REFERENCE TO RELATED APPLICATIONS

This application is a national stage filing under 35 U.S.C. 371 of PCT/IB2019/060133, filed Nov. 25, 2019, which claims the benefit of JP Application No. 2018-231694, filed Dec. 11, 2018, the disclosure of which is incorporated by reference in its/their entirety herein.

TECHNICAL FIELD

One aspect of the present disclosure relates to a position detection system, a position detection method, an angle detection method, and a marker.

BACKGROUND ART

A demand has been made for detecting a position of a movable body moving with respect to a stationary body. For example, Patent Document 1 describes a flight body as a movable body that accurately detects a positional relationship between the flight body and a landing location unit as a stationary body to land on the landing location unit. A millimeter wave radar device provided in the landing location unit captures and tracks the flight body to detect a positional relationship between the flight body and the landing location unit according to Patent Document 1.

CITATION LIST

Patent Documents

Patent Document 1: JP 11-72558 A

SUMMARY

Technical Problem

However, detection of a positional relationship between the flight body and the landing location unit by emitting a radio wave such as a millimeter wave radar cannot be performed at the time of a breakdown caused by a disaster or when an energy supply is lost. As such, there has been a demand for easily performing detection of a position, adjustment of a position, detection of an angle and the like of a moving body with respect to a stationary body.

Solution to Problem

A position detection system according to an aspect of the present disclosure is a position detection system for detecting a position of a movable body moving with respect to a stationary body, the position detection system including a light source provided in one of the stationary body and the movable body, an imaging unit provided in one of the stationary body and the movable body, a marker provided in the other of the stationary body and the movable body, and a position detecting unit configured to detect a position of the movable body with respect to the stationary body based on luminance of an image of the marker acquired by the imaging unit, wherein the marker includes a reflective layer, and a light control layer provided in the reflective layer and including a main surface, and the light control layer transmits light having an angle of incidence with respect to the main surface being within a predetermined threshold value.

A position detection method according to an aspect of the present disclosure is a position detection method for adjusting a position of a movable body moving with respect to a stationary body, the method including the steps of emitting light from a light source provided in one of the stationary body and the movable body to a marker provided in the other of the stationary body and the movable body, acquiring an image including the marker, and detecting a position of the movable body with respect to the stationary body based on luminance of an image of the marker acquired, wherein the marker includes a reflective layer, and a light control layer provided in the reflective layer and having a main surface, and the light control layer transmits light having an angle of incidence with respect to the main surface being within a predetermined threshold value.

An angle detection method according to an aspect of the present disclosure is an angle detection method for detecting a relative angle with respect to a target, the method including the steps of emitting light from a light source to a marker provided in the target, acquiring an image including the marker, and detecting the relative angle with respect to the target based on luminance of an image of the marker acquired, wherein the marker includes a reflective layer, and a light control layer provided in the reflective layer and including a main surface, and the light control layer transmits light having a predetermined angle of incidence with respect to the main surface.

A marker according to an aspect of the present disclosure is a marker including a reflective layer, and a light control layer provided in the reflective layer and including a main surface, wherein the light control layer transmits light having an angle of incidence with respect to the main surface being within a predetermined threshold value, the light control layer includes at least two regions, and the threshold values of the two regions are different from each other, and the reflective layer reflects light having passed through the light control layer, and luminance of the reflected light is used to detect a position of the marker.

Advantageous Effects

According to an aspect of the present disclosure, detection of a position, adjustment of a position, detection of an angle, and the like of a movable body with respect to a stationary body can be performed easily.

BRIEF DESCRIPTION OF DRAWINGS

FIG. 5A is a view illustrating an end face of a light control layer 4, and FIG. 5B is a view of the light control layer 4 from a thickness direction.

FIGS. 7A to 7D are views for explaining retroreflection.

DESCRIPTION OF EMBODIMENTS

Detailed descriptions of the embodiments according to the present disclosure are given below with reference to the attached drawings. Note that in the description of the drawings, identical or equivalent elements are denoted by the same reference signs, and duplicate descriptions of such elements are omitted.

Figure 1:
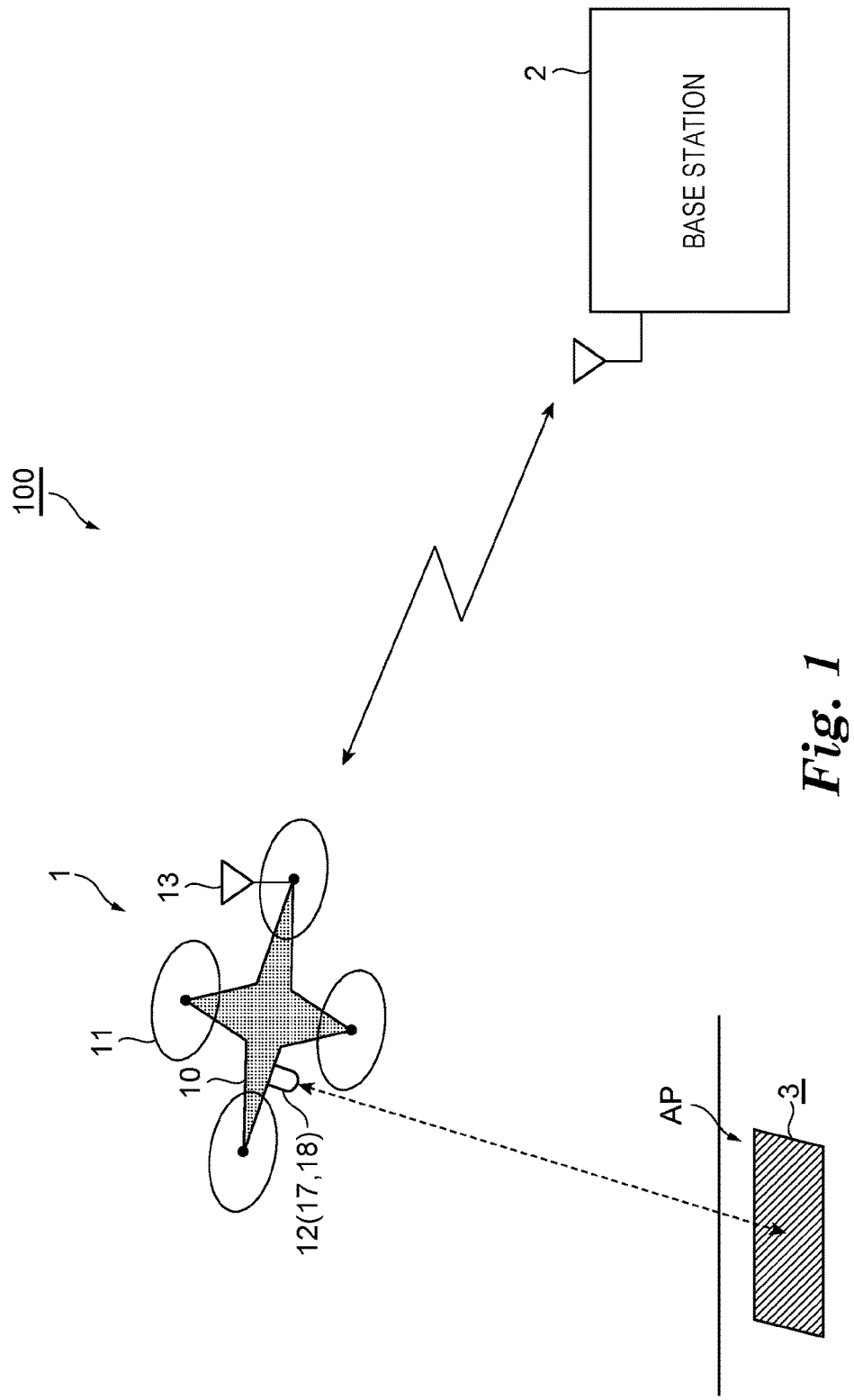
FIG. 1 is a schematic configuration view illustrating a position detection system according to an embodiment of the present disclosure.

FIG. 1 is a schematic configuration view illustrating a position detection system 100 according to an embodiment of the present disclosure. As illustrated in FIG. 1, the position detection system 100 includes a flight body 1 (movable body), a base station 2, and a marker 3 provided in a landing location unit AP (stationary body). The position detection system 100 is a system configured to detect a position of the flight body 1 that moves with respect to the landing location unit AP having a position fixed, and to guide the flight body 1 to adjust the position of the flight body 1. A position of the moving body with respect to the stationary body to be detected may be any form of information as long as a relative positional relationship between the flight body 1 and the stationary body can be comprehended.

The flight body 1 is an unmanned aerial vehicle such as a drone. The flight body 1 is capable of self-sustained flight. The flight body 1 includes a main body unit 10, a propeller unit 11, a camera 12 with a light source, and a transmission/reception unit 13 configured to perform communication. The main body unit 10 includes a frame constituting the flight body 1, an exterior, an internal mechanism, an electronic device, and the like. The propeller unit 11 rotates to generate lift force and thrust force.

Figure 4A:
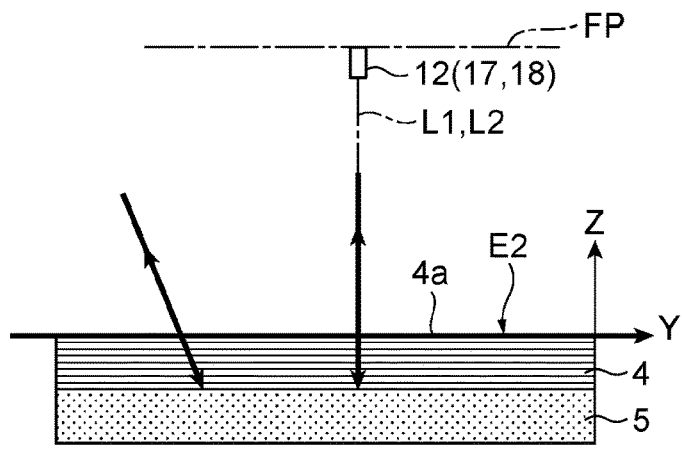
FIGS. 4A to 4D are views for explaining a relationship between an angle of incidence and reflection of light in each region.

The camera 12 with a light source is an electronic device into which a light source 17 configured to irradiate with light and an imaging unit 18 configured to acquire an image are integrated. The light source 17 irradiates with light downward from the main body unit 10. The imaging unit 18 acquires an image of a location irradiated with light by the light source 17. In the present embodiment, the light source 17 irradiates the marker 3 with light during landing. Furthermore, the imaging unit 18 acquires an image of the marker 3 irradiated with light. The light source 17 emits light in a direction perpendicular to a horizontal plane of the flight body 1. As illustrated in FIG. 4A, a horizontal plane FP of the flight body 1 is a reference plane of the flight body 1, and is a virtual surface that spreads in the horizontal direction when the flight body 1 lands on a horizontal ground surface. An optical axis L1 of light emitted by the light source 17 is perpendicular to the horizontal plane FP. Furthermore, an optical axis L2 of the imaging unit 18 is also perpendicular to the horizontal plane FP.

The transmission/reception unit 13 transmits and receives information wirelessly to and from the base station 2. A plurality of the base stations 2 are scattered over each place in an area in which the flight body 1 can fly. Accordingly, the transmission/reception unit 13 communicates with the base station 2 nearest the flight body 1.

Figure 2:
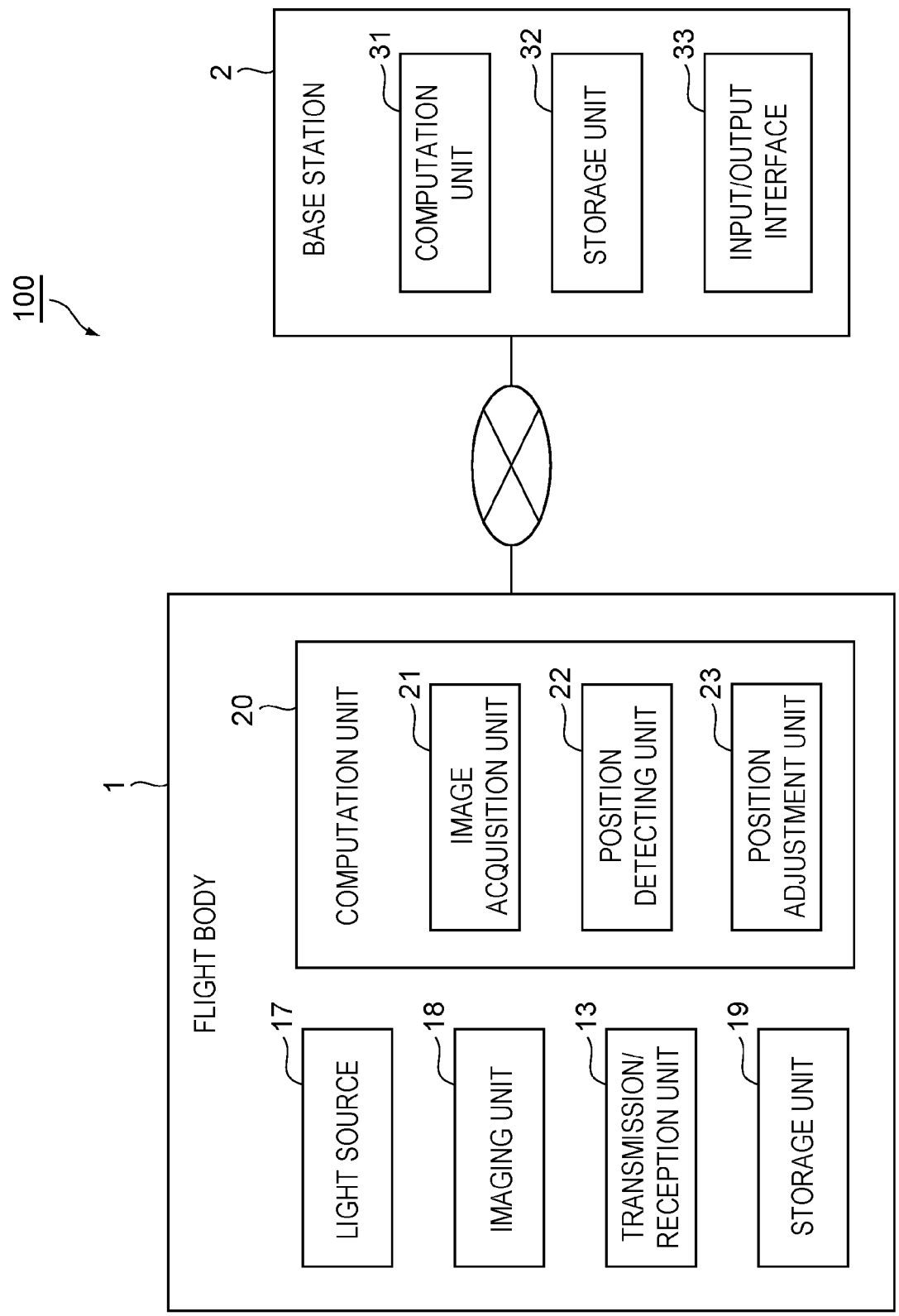
FIG. 2 is a block diagram illustrating a block configuration of the position detection system.

FIG. 2 is a block diagram illustrating a block configuration of the position detection system 100. As illustrated in FIG. 2, the flight body 1 includes the above-described light source 17, the above-described imaging unit 18, the above-described transmission/reception unit 13, a storage unit 19, and a computation unit 20. The storage unit 19 includes a built-in memory, an external memory, and the like, and stores various types of information.

The computation unit 20 is a unit configured to perform various types of calculation of the flight body 1. The computation unit 20 includes a processor, a memory, and the like. The processor is a computing unit such as a Central Processing Unit (CPU). The memory is a storage medium such as a Read Only Memory (ROM) and a Random Access Memory (RAM). The computation unit 20 implements various functions by loading a program stored in a ROM onto a RAM, and executing with the CPU the program loaded onto the RAM. The computation unit 20 includes an image acquisition unit 21, a position detecting unit 22, and a position adjustment unit 23.

The image acquisition unit 21 acquires an image by reading an image captured by the imaging unit 18. When the flight body 1 lands, the image acquisition unit 21 acquires an image of the marker 3. The position detecting unit 22 detects a position of the flight body 1 with respect to the landing location unit AP based on luminance of the image of the marker 3 captured by the imaging unit 18 and acquired by the image acquisition unit 21. The position adjustment unit 23 adjusts the position of the flight body 1 based on the result of the detection performed by the position detecting unit 22. The position adjustment unit 23 guides the flight body 1 such that the flight body 1 can land in a horizontal attitude at a position of the landing location unit AP. Then in a stage in which the position and the attitude are in order, the position adjustment unit 23 causes the flight body 1 to land in the landing location unit AP. Note that details of processing of the position detecting unit 22 and the position adjustment unit 23 will be described after the marker 3 is described.

The base station 2 includes a computation unit 31, a storage unit 32, and an input/output interface 33. The computation unit 31 is a unit configured to perform various types of calculation in the base station 2. The storage unit 32 stores various types of information. The input/output interface 33 includes an information input device such as a keyboard, a mouse, and a touch panel, and an information output device such as a display and a speaker. The storage unit 32 of the base station 2 may store information of the marker 3 provided in the landing location unit AP scattered over each place. For example, the base station 2 may transmit to the flight body 1 position information of the landing location unit AP which is to be the destination and information of the marker 3 provided in the landing location unit AP. Furthermore, the computation unit 31 of the base station 2 may perform some of the processing to be performed by the computation unit 20 of the flight body 1, and transmit the calculation result to the flight body 1.

Figure 3A:
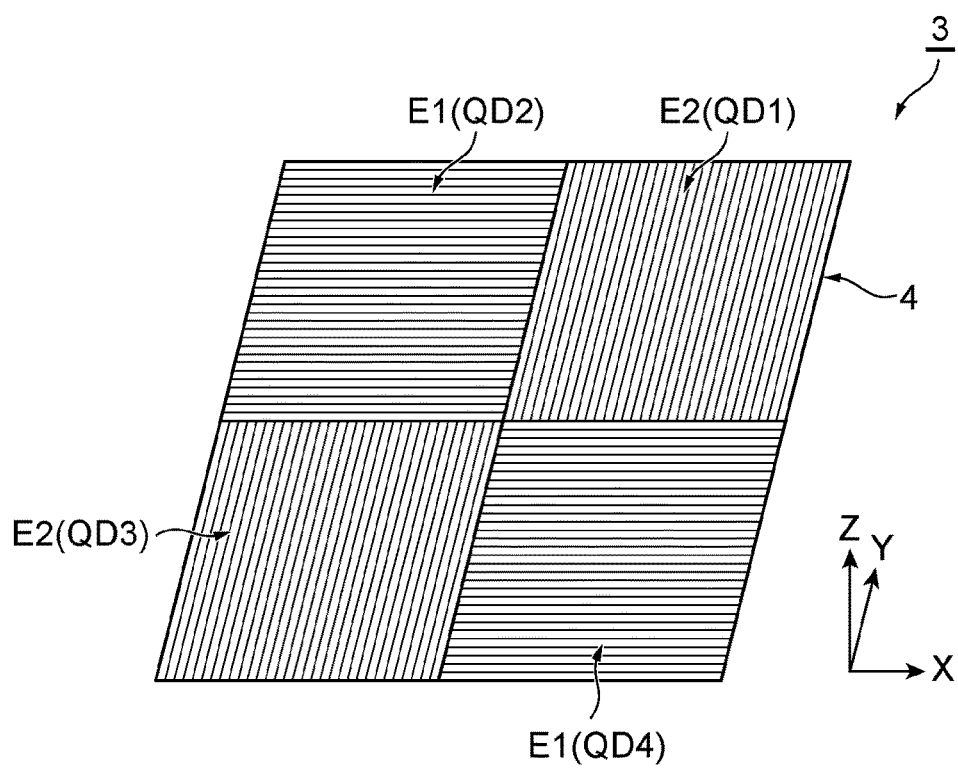
FIG. 3A is a perspective view of a marker.
Figure 3B:
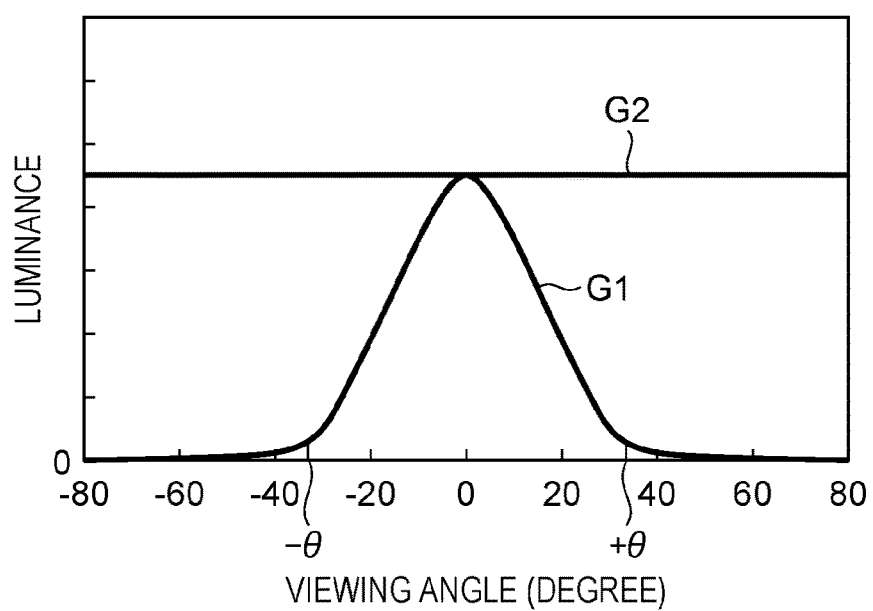
FIG. 3B is a graph illustrating a relationship between a viewing angle of an imaging unit and luminance (luminance) of the marker in an image.

Next, a detailed configuration of the marker 3 according to the present embodiment will be described with reference to FIGS. 3A and 3B and FIGS. 4A to 4D. FIG. 3A illustrates a perspective view of the marker 3. FIG. 3B is a graph illustrating a relationship between a viewing angle of the imaging unit 18 and luminance (luminance) of the marker 3 in an image. FIGS. 4A to 4D are views for explaining a relationship between an angle of incidence and reflection of light in each region.

As illustrated in FIGS. 4A to 4D, the marker 3 includes a reflective layer 5 configured to reflect light and a light control layer 4 provided in the reflective layer 5. The reflective layer 5 is a layer configured to perform retroreflection in which incident light is reflected along an optical path of the incident light. The details of the retroreflection will be described below.

The light control layer 4 is a layer configured to transmit light having an angle of incidence with respect to a main surface 4a being within a predetermined threshold value. "To transmit light having an angle of incidence being within a predetermined threshold value" refers to transmitting light having an angle of incidence being within a predetermined range at transmissibility equal to or more than a predetermined transmissibility, and transmitting light having an angle of incidence outside the predetermined range at transmissibility equal to or less than the predetermined transmissibility. Furthermore, the light control layer 4 transmits light to emit reflected light retroreflected by the reflective layer 5 from the main surface 4a. As a result, the imaging unit 18 acquires, as an image of the light control layer 4, an image indicated by luminance of the reflected light. The light control layer 4 includes at least two regions E1, E2. Threshold values of the two regions E1, E2 are different from each other. Specifically, as illustrated in FIG. 3A, when an X-axis and a Y-axis are set in the horizontal direction and a Z axis is set in the vertical direction, the marker 3 includes four sections having two rows and two columns within an X-Y plane. Of these, a section on the negative side in the X-axis direction and the positive side in the Y-axis direction is set as a region E1 (may also be referred to as a second quadrant QD2) of the light control layer 4, and a section on the positive side in the X-axis direction and the negative side in the Y-axis direction is set as a region E1 (may also be referred to as a fourth quadrant QD4) of the light control layer 4. A section on the negative side in the X-axis direction and the negative side in the Y-axis direction is set as a region E2 (may also be referred to as a third quadrant QD3) of the light control layer 4, and a section on the positive side in the X-axis direction and the positive side in the Y-axis direction is set as a region E2 (may also be referred to as a first quadrant QD1) of the light control layer 4.

Figure 4B:
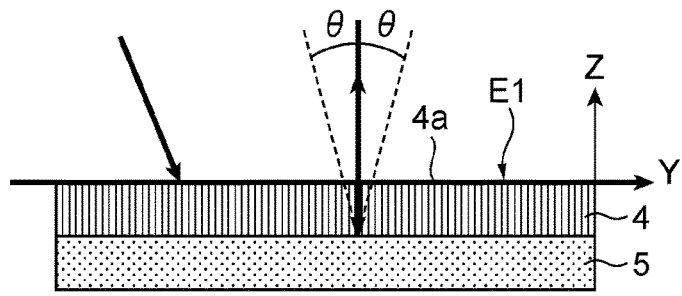
Figure 4C:
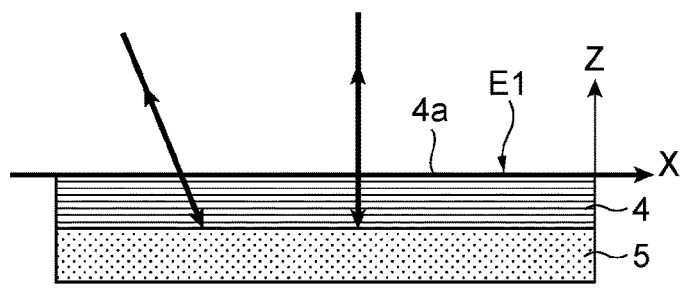
Figure 4D:
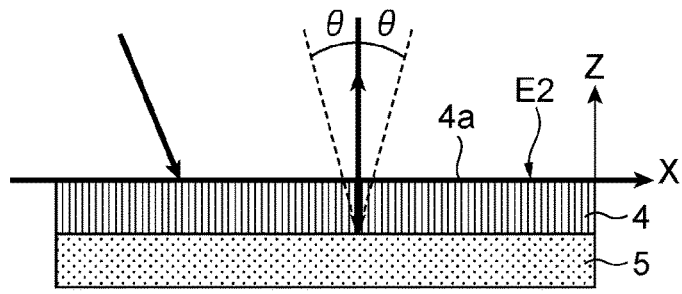

As illustrated in FIG. 4B, the region E1 of the light control layer 4 transmits light having an angle of incidence in the Y-axis direction (an angle of incidence as viewed from the X-axis direction) being within a threshold value θ, based on light perpendicularly incident on the main surface 4a. Furthermore, luminance of light passing through the region E1, as light perpendicular to the main surface 4a being the peak, gradually decreases as the angle of incidence increases. The light control layer 4 blocks light having an angle of incidence in the Y-axis direction being larger than the threshold value θ without transmitting the light. On the other hand, as illustrated in FIG. 4C, the region E1 of the light control layer 4 transmits light without particular restriction with regard to an angle of incidence in the X-axis direction (an angle of incidence as viewed from the Y-axis direction) as long as the angle of incidence in the Y-axis direction is equal to or less than the threshold value θ. As illustrated in FIG. 4D, the region E2 of the light control layer 4 transmits light having an angle of incidence in the X-axis direction (an angle of incidence as viewed from the Y-axis direction) being within the threshold value θ, based on light perpendicularly incident on the main surface 4a. Furthermore, luminance of light passing through the region E2, as light perpendicular to the main surface 4a being the peak, gradually decreases as the angle of incidence increases. The light control layer 4 blocks light having an angle of incidence in the X-axis direction being larger than the threshold value θ without transmitting the light. On the other hand, as illustrated in FIG. 4A, the region E2 of the light control layer 4 transmit light without particular restriction with regard to an angle of incidence in the Y-axis direction (an angle of incidence as viewed from the X-axis direction) as long as the angle of incidence in the X-axis direction is equal to or less than the threshold value θ. Note that in any of the regions E1, E2, an angle equal to or less than the threshold value θ includes a reference angle of 0°, namely, an angle perpendicular to the main surface 4a.

Due to the relationship described above, as illustrated in a graph G1 of FIG. 3B, luminance of the region E1 in an image captured by the imaging unit 18 peaks at a viewing angle (equal to an angle of incidence of light from the light source 17) of 0° perpendicular to the main surface 4a, and decreases gradually as a viewing angle in the Y-axis direction increases, and becomes substantially 0 when the viewing angle exceeds the threshold value θ. On the other hand, as illustrated in a graph G2 of FIG. 3B, the luminance of the region E1 in the image is constant regardless of the viewing angle in the X-axis direction. Note that the luminance of the graph G2 is substantially constant at luminance that is aligned with the peak of the graph G1 but corresponds to the viewing angle in the Y-axis direction. Furthermore, as illustrated in the graph G1 of FIG. 3B, luminance of the region E2 in an image captured by the imaging unit 18 peaks at a viewing angle of 0° perpendicular to the main surface 4a, and decreases gradually as a viewing angle in the X-axis direction increases, and becomes substantially 0 when the viewing angle exceeds the threshold value θ. On the other hand, as illustrated in the graph G2 of FIG. 3B, the luminance of the region E2 in the image is constant regardless of the viewing angle in the Y-axis direction.

Figure 6:
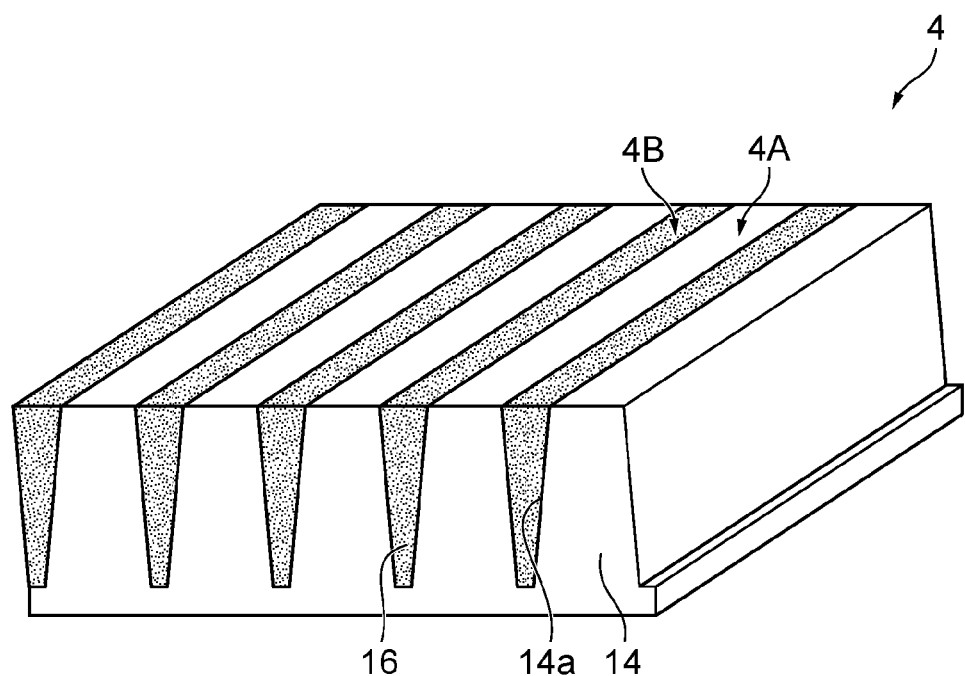
FIG. 6 is a view illustrating a light control layer according to a modified example.

Next, a configuration of the light control layer 4 will be described in detail with reference to FIGS. 5A and 5B and FIG. 6. FIG. 5A is a view illustrating an end face of the light control layer 4, and FIG. 5B is a view of the light control layer 4 viewed from a thickness direction. The light control layer 4 is a member that is a so-called louver film. The light control layer 4 is a layer including a non-transmissive portion 4B incorporated into a transmissive portion 4A. The transmissive portion includes a polymer resin or the like having high transparency, and the non-transmissive portion 4B is minute and referred to as a louver. The non-transmissive portion 4B is provided within the transmissive portion 4A at a constant pitch in one direction in a planar direction (the vertical direction in FIGS. 5A and 5B, and hereinafter may be referred to as an "arrangement direction"). In the form illustrated in FIGS. 5A and 5B, the non-transmissive portion 4B is formed in an entire region in the thickness direction of the transmissive portion 4A. Furthermore, a plurality of the non-transmissive portions 4B extend parallel to each other along a direction orthogonal to the arrangement direction.

Such a light control layer 4 blocks light in an oblique direction out of the incident light by the non-transmissive portion 4B. Namely, light incident perpendicularly or at a small inclination angle on the main surface 4a of the light control layer 4 (light traveling in a direction indicated by D1 in the figure) passes through the transmissive portion 4A. Note that the light having passed through the transmissive portion 4A is reflected by the reflective layer 5 at a position of a main surface 4b. On the other hand, light incident in the oblique direction on the main surface 4a at an angle greater than a threshold value (light traveling in a direction indicated by D2 in the figure) is blocked by the non-transmissive portion 4B. Note that light to be incident from a position of the non-transmissive portion 4B out of the main surfaces 4a is blocked at the position of the main surface 4a. As a result, the light control layer 4 has a function of controlling a direction of travel of light passing through the transmissive portion 4A in a predetermined angular range, and to provide uniform luminance distribution.

In this light control layer 4, the transmissive portion 4A may include a polymer resin having high transparency. Various types of resins can be used as the polymer resin, such as a thermoplastic resin, a thermosetting resin, and a resin curable by an energy ray such as an ultraviolet ray. Examples of the polymer resin include a cellulose resin such as cellulose acetate butyrate and triacetyl cellulose; a polyolefin resin such as polyethylene and polypropylene; a polyester resin such as polyethylene terephthalate; polystyrene; polyurethane; vinyl chloride; an acrylic resin; a polycarbonate resin; and a silicone resin.

On the other hand, the non-transmissive portion 4B is formed from a light blocking substance capable of absorbing or reflecting light. As such a light blocking substance, for example, (1) a dark pigment or a dark dye such as in black or gray, (2) a metal such as aluminum and silver, (3) a dark colored metal oxide, and (4) the above-described polymer resins containing a dark pigment or a dark dye can be used.

In the light control layer 4, it is preferable that the width of the transmissive portion 4A, namely, the width of a polymer resin portion between the non-transmissive portion 4B and the non-transmissive portion 4B, is greater than the width of the non-transmissive portion 4B to prevent a decrease in light transmissibility of all the light control layer 4. The width of the transmissive portion 4A may be from 20 to 500 μm, and may be from 40 to 200 μm. The width of the non-transmissive portion 4B may be from 0.5 to 100 μm, and may be from 1 to 50 μm. Furthermore, an angle of the non-transmissive portion 4B may normally be in the range from 0 to 45°. Note that the angle of the non-transmissive portion 4B refers to an angle with respect to the main surface 4a of the light control layer 4, and the state orthogonal to the main surface 4a (the state illustrated in FIGS. 5A and 5B) is 0 degree.

Such a light control layer 4 can be manufactured, for example, as follows. First, a layer including a light blocking substance is laminated on one main surface of a polymer film used as the transmissive portion 4A to form a laminate made from the polymer film/light blocking substance. A plurality of such laminates are prepared, and are further laminated to form a light control layer precursor in which the polymer film and the light blocking substance are alternately arranged, and are fixed to each other. The precursor is then sliced to have a predetermined thickness in a direction orthogonal to the main surface of the precursor, namely, along a laminating direction or a thickness direction. As a result, the light control layer 4 is completed. Furthermore, a commercially available product such as "3M (trade name) security/privacy filter" available from 3M Japan Limited can also be used as the light control layer 4.

Note that the configuration (and manufacturing method) of the light control layer 4 is not limited to the configuration illustrated in FIGS. 5A and 5B. For example, the light control layer 4 illustrated in FIG. 6 may be employed. The light control layer 4 illustrated in FIG. 6 is configured by providing a base member 14 that is light transmissive and that includes a plurality of grooves 14a arranged parallel to each other, and filling the grooves 14a with a light-absorbing material or a light reflective material. In this case, the non-transmissive portion 4B extends to a halfway position in the thickness direction of the transmissive portion 4A.

Figure 7D:
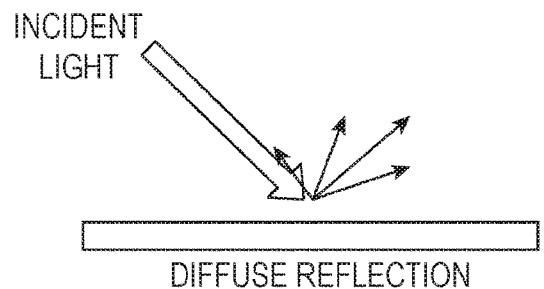
Figure 7D:
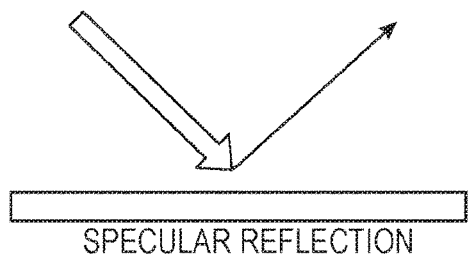
Figure 7D:
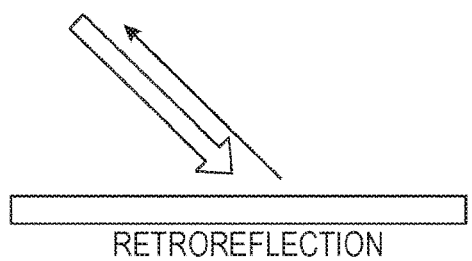
Figure 7D:
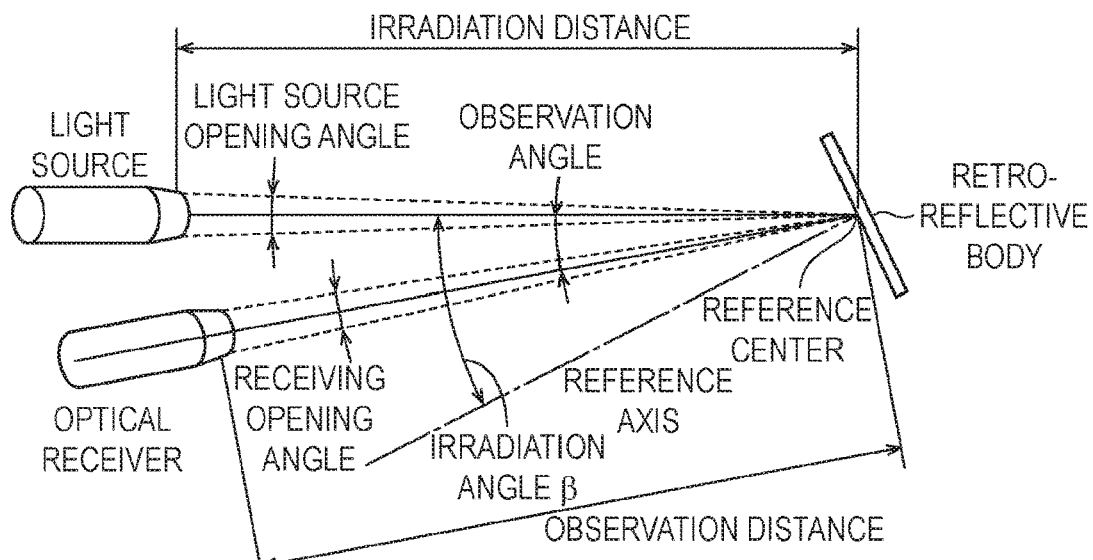

Next, the reflective layer 5 will be described with reference to FIGS. 7A to 7D. Reflection include, diffuse reflection in which incident light diffuses at a reflection surface as illustrated in FIG. 7A, specular reflection in which incident light reflects in an opposite direction at the same angle relative to a reference line perpendicular to the reflective surface as illustrated in FIG. 7B, and retroreflection that is reflection along a light path of incident light as illustrated in FIG. 7C. In the present embodiment, the reflective layer 5 includes a member that performs retroreflection as illustrated in FIG. 7C. A member having an observation angle of 0.2°, an angle of incidence of 5°, and a retroreflection coefficient of 15 or greater, and preferably 50 or greater, is employed as the member that performs retroreflection. Note that a retroreflection coefficient R' is calculated by "R'=I/Es×A". With reference to FIG. 7D, "I" is luminous intensity to the observation angle by a retroreflective surface. "Es" is illuminance received by the retroreflective surface placed perpendicular to a direction of incident light. "A" is area where the retroreflective surface receives incident light (test piece surface area). Note that "I" is further expressed as "I=Er×d$^2$". "Er" is illuminance on an optical receiver in the arrangement. "d" is a distance between the test piece surface center and a light receiving reference surface. As a material of such a member that constitutes the reflective layer 5, a "3M (trade name) Diamond Grade (trade name) reflection sheet, flexible prism reflection sheet" available from 3M Japan, or the like is employed.

However, the reflective layer 5 may be a member that performs diffuse reflection or specular reflection. Furthermore, a light-emitting layer that emits light by itself may be used instead of the reflective layer 5.

Figure 8A:
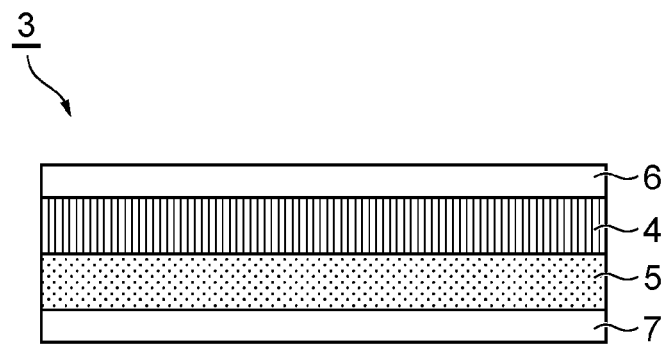
FIGS. 8A to 8C are views illustrating a laminate structure of a marker.
Figure 8B:
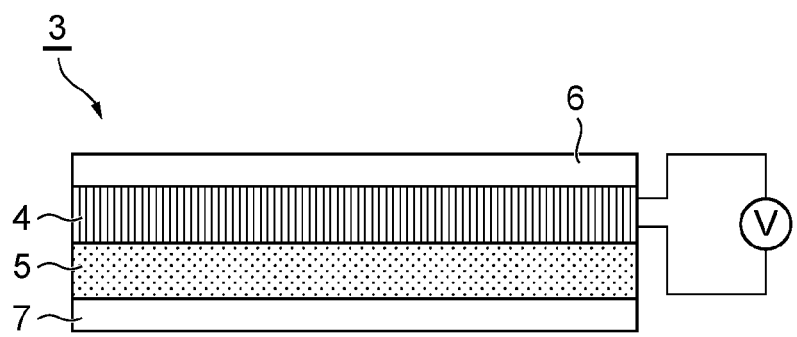
Figure 8C:
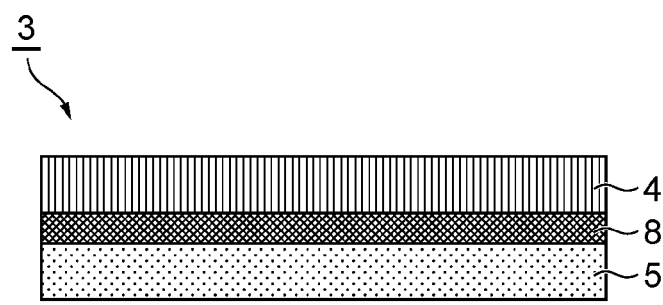
Figure 9A:
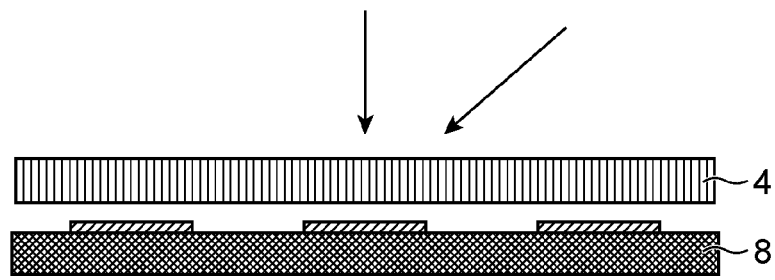
FIGS. 9A to 9C are views illustrating a modified example of a marker.
Figure 9B:
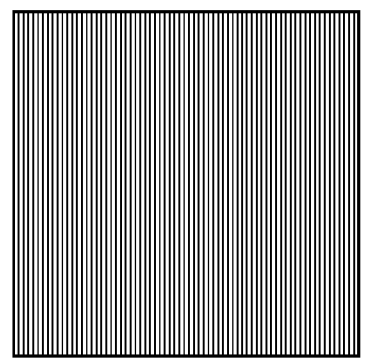
Figure 9C:
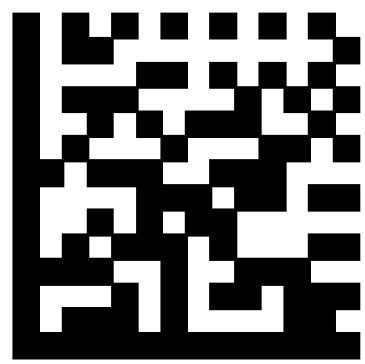

In more detail, a configuration as illustrated in FIGS. 8A to 8C may be employed as a layer configuration of the maker 3. In FIG. 8A, a protective layer 6 is formed in the main surface 4a of the light control layer 4. Furthermore, an adhesive layer 7 is formed in a main surface of the reflective layer 5 on the side opposite the light control layer 4. Furthermore, in FIG. 8B, the light control layer 4 includes a configuration in which a threshold value for an angle of incidence of light to be transmitted can be adjusted by applying a voltage. Furthermore, in FIG. 8C, a print layer 8 in which a two-dimensional code, ID, or the like, is described is formed between the light control layer 4 and the reflective layer 5. The example of FIG. 8C is illustrated in more detail in FIGS. 9A to 9C. When an angle of incidence (namely, a viewing angle) is vertical, contents described in the print layer 8 can be confirmed in an image, as illustrated in FIG. 9C. When the angle of incidence is too large, the contents described in the print layer 8 cannot be confirmed in the image, as illustrated in FIG. 9B.

The position detecting unit 22 and the position adjustment unit 23 of the flight body 1 perform various operations by using the marker 3 configured as described above. The position detecting unit 22 detects a position of the flight body 1 with respect to the marker 3 based on a difference in luminance of each region E1, E2 of the marker 3 in an image. Furthermore, when the flight body 1 is moved, the position detecting unit 22 detects a position of the flight body 1 with respect to the marker 3 based on an aspect of a change in luminance of each region E1, E2 of the marker 3 in an image. The position detecting unit 22 adjusts a position of the flight body 1 to make a difference in luminance of the region E1, E2 in an image smaller. A state in which a difference in luminance of the region E1, E2 is large means that a position of the flight body 1 with respect to the marker 3 is greatly shifted in any of the X-axis direction and the Y-axis direction. Thus, the flight body 1 can be brought closer to the marker 3 by the position adjustment unit 23 performing adjustment to make a difference in luminance between the region E1, E2 smaller. The position adjustment unit 23 performs adjustment of a position of the flight body 1 to make luminance of the marker 3 in an image reach a maximum value. The luminance of the marker 3 in the image reaches the maximum value when an angle of incidence according to the light source 17 and a viewing angle of the imaging unit 18 are perpendicular to the marker 3. Thus, the position adjustment unit 23 is capable of positioning the flight body 1 directly above the marker 3 by adjusting the position to make the luminance of the marker 3 reach the maximum value. The position adjustment unit 23 determines whether to land the flight body 1 based on the luminance of the marker 3.

Next, details of processing by the computation unit 20 will be described with reference to FIGS. 10 to 13 and FIGS. 14A to 14D. FIGS. 10 to 13 are flowcharts illustrating the details of processing by the computation unit 20. FIGS. 14A to 14D are views illustrating the marker 3 in an image. Note that in the description of the image and the movement of the flight body 1, while the words "vertical" and "horizontal" are used, "vertical" corresponds to the Y-axis direction of the marker 3 described above, and "horizontal" corresponds to the X-axis direction of the marker 3.

Figure 10:
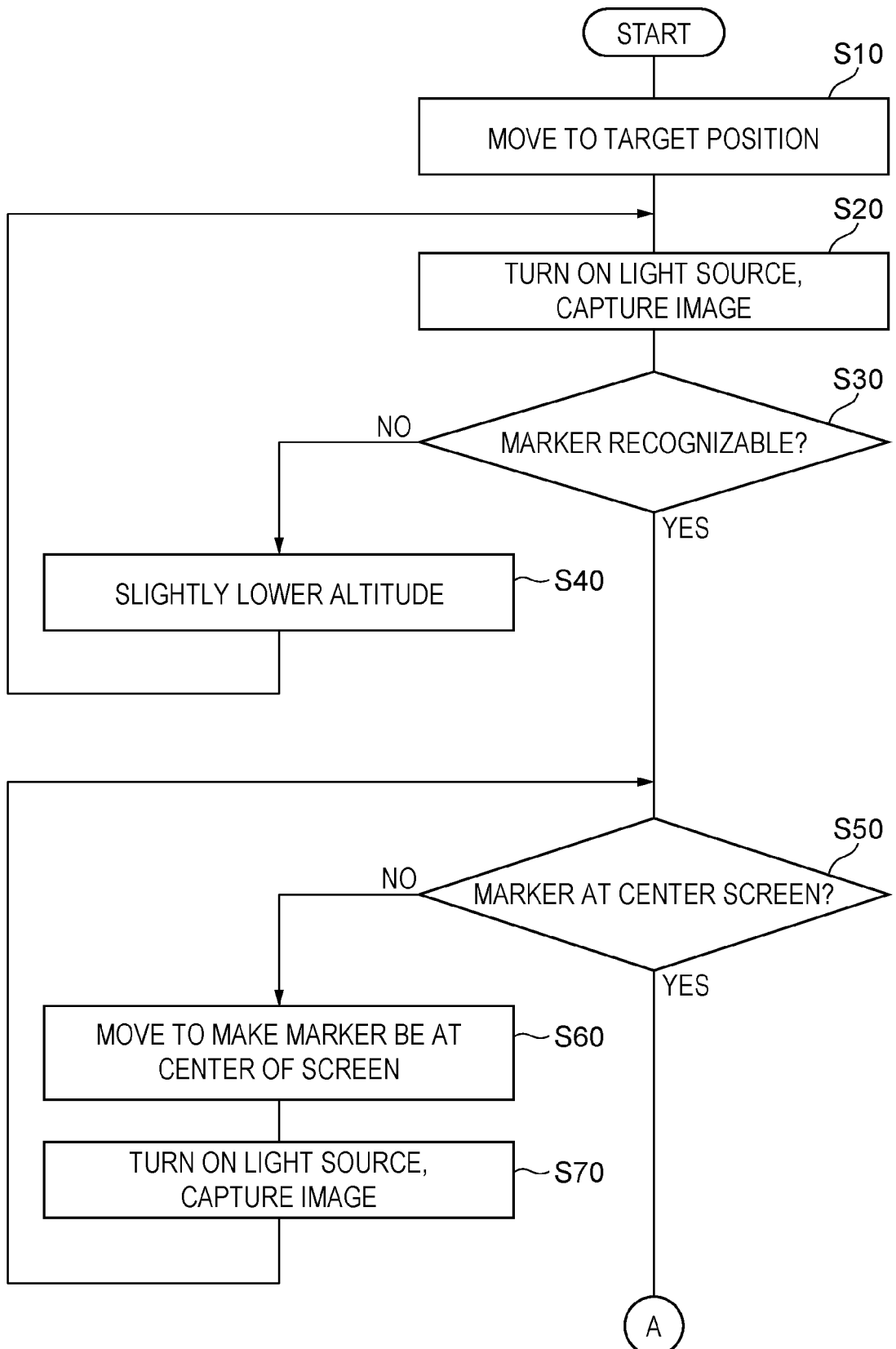
FIG. 10 is a flowchart illustrating processing details of a computation unit.

As illustrated in FIG. 10, the computation unit 20 moves the flight body 1 to a target position (step S10). Next, the computation unit 20 turns on the light source 17, and captures an image by the imaging unit 18 (step S20). The position detecting unit 22 comprehends the altitude of the flight body 1 by determining whether the marker 3 can be recognized in the image (step S30). Namely, when the marker 3 in the image is determined to be too small and not recognizable, the position detecting unit 22 detects that the altitude of the flight body 1 is too high. When the marker 3 in the image is determined to be recognizable, the position detecting unit 22 detects that the altitude of the flight body 1 is an altitude that enables processing for landing to be performed. At step S30, when the marker 3 is determined to be unrecognizable, the position adjustment unit 23 guides the flight body 1 to slightly lower the altitude of the flight body 1 (step S40). Subsequently, the processing at step S20 and step S30 is repeated.

At step S30, when the marker 3 is determined to be recognizable, the position detecting unit 22 detects a position of the flight body 1 with respect to the marker 3 by determining whether the marker 3 is present at the center of the image (step S50). Namely, when the marker 3 is at the center of the image, the position detecting unit 22 can detect that the flight body 1 is at a position not shifted from the landing location unit AP, and when the marker 3 is not at the center of the image, the position detecting unit 22 can detect that the flight body 1 is at a position shifted from the landing location unit AP. At step S50, when the marker 3 is determined to be not at the center of the image, the position adjustment unit 23 moves the flight body 1 such that the marker 3 is brought to the center of the image (step S60). Subsequently, the computation unit 20 turns on the light source 17, and captures an image by the imaging unit 18 (step S70). Then, the processing at step S50 is repeated. At step S50, when the marker 3 is determined to be at the center of the image, the processing transitions to "A" in FIG. 11.

Figure 11:
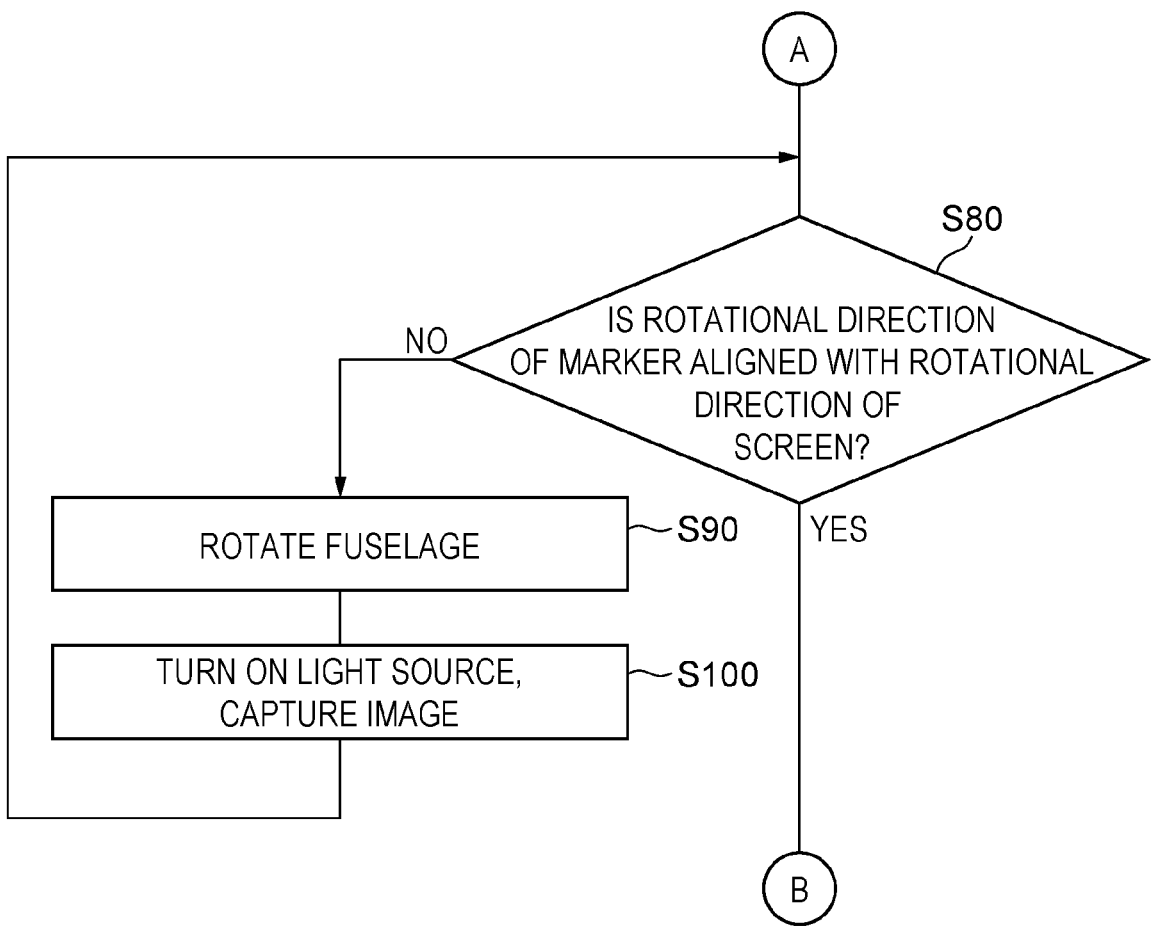
FIG. 11 is a flowchart illustrating processing details of a computation unit.
Figure 14A:
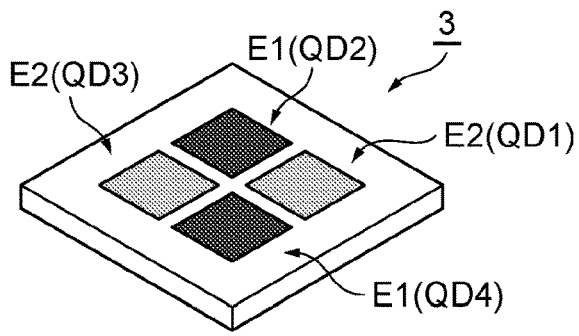
FIGS. 14A to 14D are views illustrating a marker in an image.

As illustrated in FIG. 11, the position detecting unit 22 detects misalignment in the rotational direction of the flight body 1 with respect to the landing location unit AP by determining whether the rotational direction of the marker 3 is aligned with the rotational direction of the image (step S80). As illustrated in FIG. 14A, when the marker 3 is captured obliquely in a longitudinal direction and in a lateral direction in the image, the position detecting unit 22 can detect that the flight body 1 is at a position shifted in the rotational direction with respect to the landing location unit AP. At S80, when the rotational direction of the marker 3 is not aligned with the rotational direction of the image, the position adjustment unit 23 rotates a fuselage of the flight body 1 (step S90). Subsequently, the computation unit 20 turns on the light source 17, and captures an image by the imaging unit 18 (step S100). Then, the processing at step S80 is repeated. At step S80, when the rotational direction of the marker 3 is aligned with the rotational direction of the image (for example, the state illustrated in FIGS. 14B, 14C, 14D), the processing transitions to "B" in FIG. 12.

Figure 12:
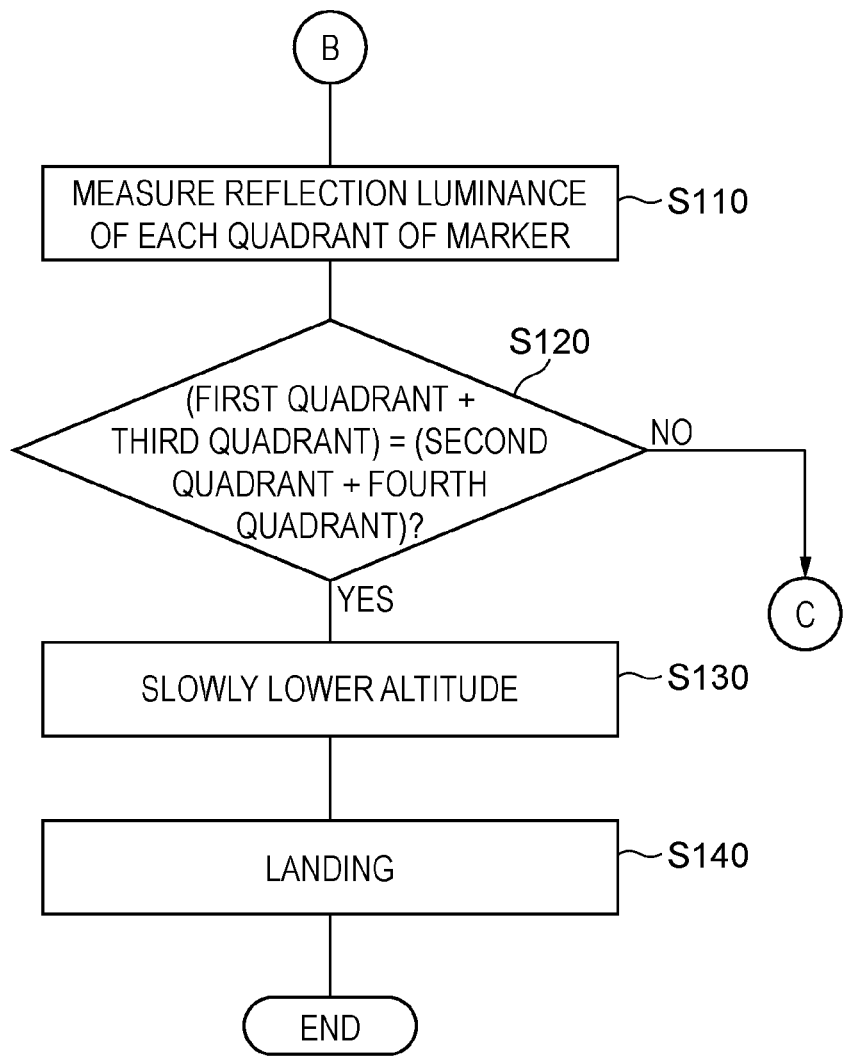
FIG. 12 is a flowchart illustrating processing details of a computation unit.

As illustrated in FIG. 12, the position detecting unit 22 measures luminance of each quadrant of the marker 3 in the image (step S110). The position detecting unit 22 determines whether luminance of the "first quadrant QD1+third quadrant QD3" including the region E2 and luminance of the "second quadrant QD2+fourth quadrant QD4" including the region E1 are equal (step S120). As a result, the position detecting unit 22 is capable of detecting whether the flight body 1 is positioned directly above the marker 3. Namely, as illustrated in FIG. 14D, when the luminance of the region E1 becomes equal to the luminance of the region E2 in the image, the luminance of the region E1 and the luminance of the region E2 are each a maximum value due to the angle of incidence of the light source 17 and the viewing angle of the imaging unit 18 that become perpendicular to the main surface of the marker 3 both in a longitudinal direction and in a lateral direction. Accordingly, the position detecting unit 22 is capable of determining whether the flight body 1 is positioned directly above the marker 3 by determining the condition according to step S120. Furthermore, the position adjustment unit 23 is capable of determining whether the flight body 1 is in a state of being capable of landing. When the condition is determined to be satisfied at step S120, the position adjustment unit 23 determines that the flight body 1 is in a state of being capable of landing, and performs control such that the altitude of the flight body 1 is slowly lowered (step S130). Subsequently, the flight body 1 makes a landing (step S140), and the processing by the computation unit 20 ends. On the other hand, when the condition is determined not to be satisfied at step S120, the position adjustment unit 23 determines that the flight body 1 is not in a state of being capable of landing, and transitions to "C" in FIG. 13.

Figure 13:
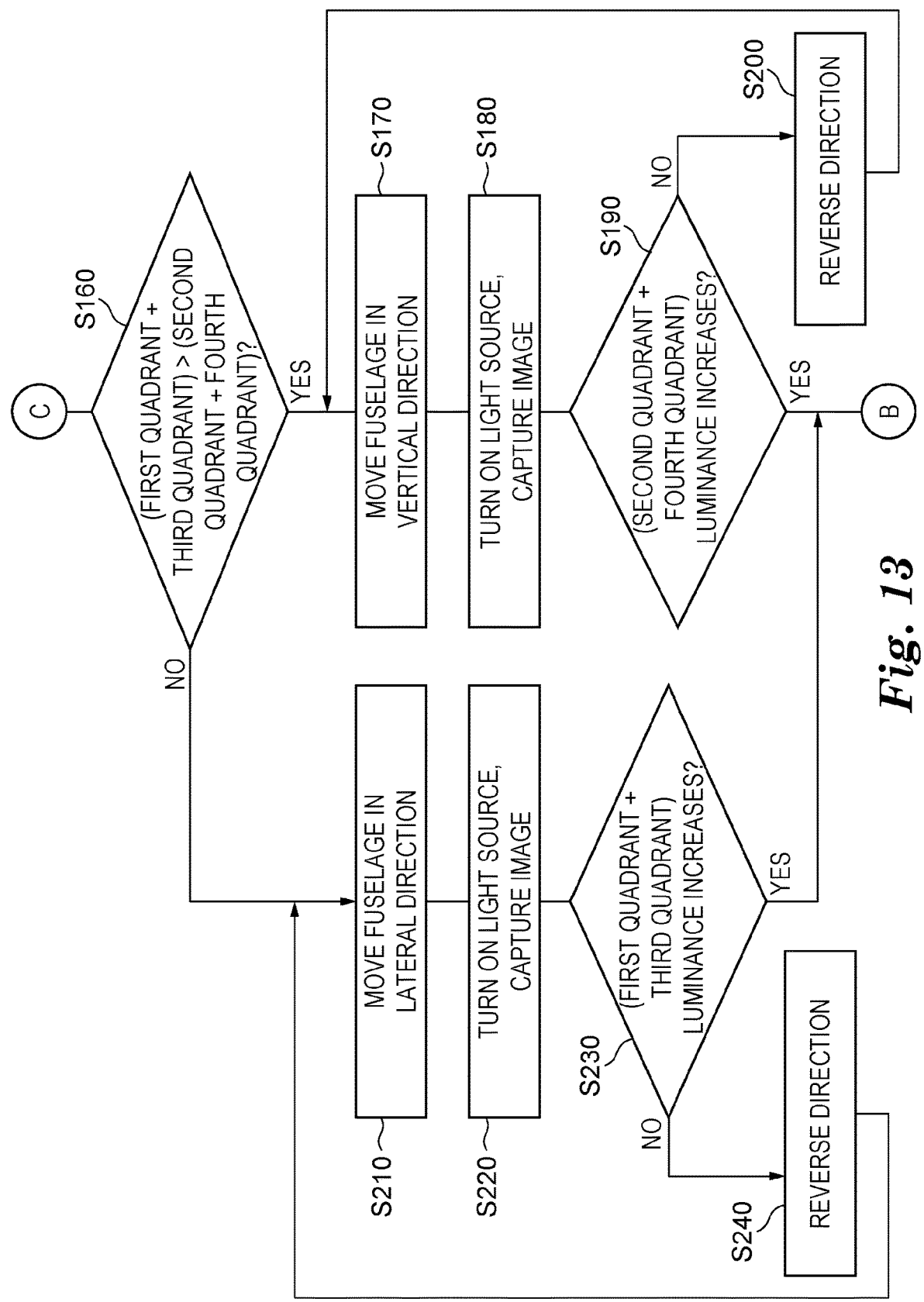
FIG. 13 is a flowchart illustrating processing details of a computation unit.

As illustrated in FIG. 13, the position detecting unit 22 determines whether luminance of the "first quadrant QD1+ third quadrant QD3" including the region E2 is greater than luminance of the "second quadrant QD2+fourth quadrant QD4" including the region E1 (step S160). As a result, the position detecting unit 22 is capable of detecting whether the flight body 1 is shifted in the vertical direction or the lateral direction with respect to the marker 3.

Figure 14B:
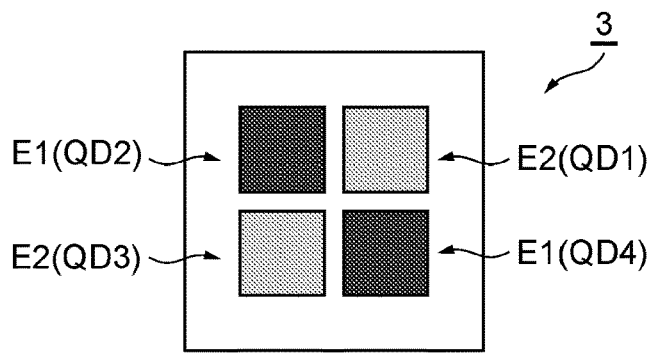

When the luminance of the second region is high as illustrated in FIG. 14B, the condition is determined to be satisfied at step S160. At this time, the position detecting unit 22 detects that the flight body 1 is at a position shifted in the vertical direction with respect to the marker 3. The position adjustment unit 23 moves the fuselage of the flight body 1 to one side in the vertical direction (step S170). The computation unit 20 turns on the light source 17, and captures an image by the imaging unit 18 (step S180). The position detecting unit 22 determines whether luminance of the "second quadrant QD2+fourth quadrant QD4" has increased (step S190). When the flight body 1 moves in a direction that reduces the shift in the vertical direction, the luminance of the region E1 in the image increases, and when the flight body 1 moves in a direction that increases the shift in the vertical direction, the luminance of the region E1 in the image decreases. Accordingly, the position detecting unit 22 is capable of detecting whether the flight body 1 is at a position that resolves the shift in the vertical direction by performing the determination of step S190. When the condition is determined to be satisfied at step S190, the processing returns to "B" in FIG. 12. On the other hand, when the condition is determined not to be satisfied at step S190, the position adjustment unit 23 changes the direction toward the other side in the vertical direction (step S200). Then, the processing is repeated from step S170 for the movement in that direction.

Figure 14C:
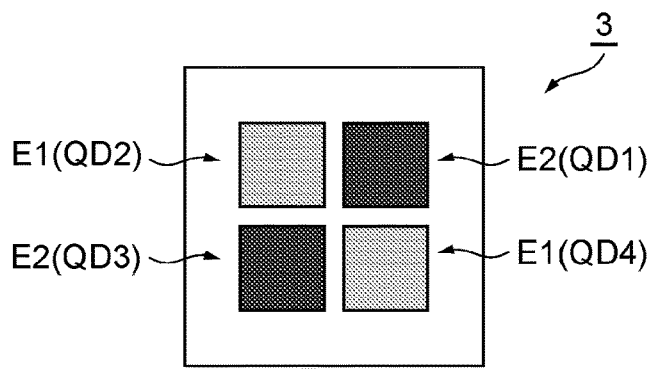
Figure 14D:
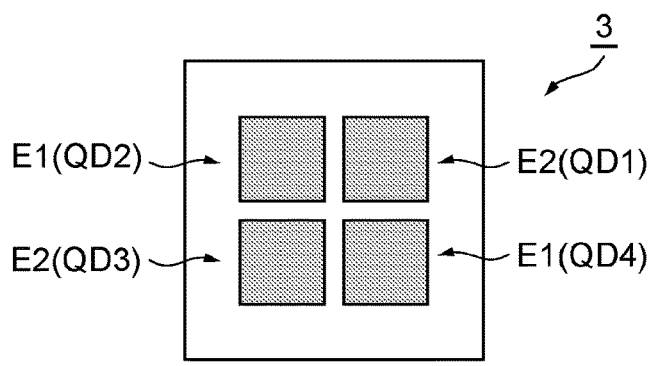

When the luminance of the first region is high as illustrated in FIG. 14C, the conditions is determined not to be satisfied at step S160. At this time, the position detecting unit 22 detects that the flight body 1 is at a position shifted in the lateral direction with respect to the marker 3. The position adjustment unit 23 moves the fuselage of the flight body 1 to one side in the lateral direction (step S210). The computation unit 20 turns on the light source 17, and captures an image by the imaging unit 18 (step S220). The position detecting unit 22 determines whether luminance of the "first quadrant QD1+third quadrant QD3" has increased (step S230). When the flight body 1 moves in a direction that reduces the shift in the lateral direction, the luminance of the region E2 in the image increases, and when the flight body 1 moves in a direction that increases the shift in the lateral direction, the luminance of the region E2 in the image decreases. Accordingly, the position detecting unit 22 is capable of detecting whether the flight body 1 is at a position that resolves the shift in the lateral direction by performing the determination of step S230. When the condition is determined to be satisfied at step S230, the processing returns to "B" in FIG. 12. On the other hand, when the condition is determined not to be satisfied at step S230, the position adjustment unit 23 changes a direction toward the other side in the lateral direction (step S240). Then, the processing is repeated from step S210 for the movement in that direction.

As described above, the processing of FIG. 13 is repeated, and thus the shift in the vertical direction and the lateral direction of flight body 1 are gradually eliminated, and eventually the flight body 1 is disposed directly above the marker 3, and landing is performed.

Next, actions and effects of the position detection system 100, the position detection method and the marker 3 according to the present embodiment will be described.

The position detection system 100 according to the present embodiment is a position detection system 100 for detecting a position of a flight body 1 moving with respect to a landing location unit AP, the position detection system 100 including a light source 17 provided in the flight body 1, an imaging unit 18 provided in the flight body 1, a marker 3 provided in the landing location unit AP, and a position detecting unit 22 configured to detect a position of the flight body 1 with respect to the landing location unit AP based on luminance of an image of the marker 3 acquired by the imaging unit 18, wherein the marker 3 includes a reflective layer 5, a light control layer 4 provided in the reflective layer 5 and including a main surface 4a, and the light control layer 4 transmits light having an angle of incidence with respect to the main surface 4a being within a predetermined threshold value.

In the position detection system 100, the flight body 1 is provided with the light source 17 and the imaging unit 18. Accordingly, the light source 17 emits light to the marker 3 of the landing location unit AP, and the imaging unit 18 can acquire an image of the marker 3 in a state of being irradiated with the light. The marker 3 includes the reflective layer 5 and the light control layer 4 provided in the reflective layer 5. Furthermore, the light control layer 4 transmits light having an angle of incidence with respect to the main surface 4a being within a predetermined threshold value. Light having passed through the light control layer 4 is reflected by the reflective layer 5 and reflected as luminance in the image of the imaging unit 18. That is, when a positional shift between the flight body 1 and the marker 3 is large, since light from the light source 17 does not pass through the light control layer 4, luminance of the light control layer 4 in the image reduces. When a positional shift between the flight body 1 and the marker 3 is small, since light from the light source 17 passes through the light control layer 4 and is reflected by the reflective layer 5, luminance of the light control layer 4 in the image increases. The position detecting unit 22 detects a position of the flight body 1 with respect to the landing location unit AP based on the luminance of the image of the marker 3 acquired by the imaging unit 18. Accordingly, the position detecting unit 22 is capable of easily and accurately detecting a position of the flight body 1 simply by referring to the luminance of the light control layer in the image without receiving a special radio wave or the like from the landing location unit AP. As described above, the position detection system 100 is capable of detecting a position of flight body 1 without need of emitting a special radio wave from the landing location unit AP.

The position detection system 100 further includes a position adjustment unit 23 configured to adjust a position of the flight body 1 based on luminance of an image of the marker 3 acquired by the imaging unit 18. As described above, when a positional shift between the flight body 1 and the marker 3 is small, luminance of the light control layer 4 in the image increases. Accordingly, since the position adjustment unit 23 needs only to adjust a position of the flight body 1 such that the luminance of the light control layer 4 in the image increases, adjustment of the position can be performed easily.

The light control layer 4 includes at least two regions E1, E2, and the threshold values of the two regions E1, E2 are different from each other. Appearance of the region E1 in the image and appearance of the region E2 in the image may differ as a positional relationship between the flight body 1 and the marker 3 changes. In the present embodiment, the position detecting unit 22 is capable of detecting both a position of the flight body 1 in the X-axis direction and a position of the flight body 1 in the Y-axis direction based on the luminance of the regions E1, E2 in the image. With use of the two regions E1, E2, the position detecting unit 22 is capable of detecting the position of the flight body 1 in more detail as compared to the case in which only one kind of light control layer 4 is used.

The position detection system 100 further includes a position adjustment unit 23 configured to adjust a position of the flight body 1 based on luminance of an image of the marker 3 acquired by the imaging unit 18. The position adjustment unit 23 adjusts a position of the flight body 1 to make a difference in luminance of the two regions E1, E2 in the image smaller. In this case, the position adjustment unit 23 can easily perform the adjustment of the position by simple processing of reducing the difference in luminance of the regions E1, E2 in the image, without need of performing complex calculation or the like.

The position detection system 100 further includes a position adjustment unit 23 configured to adjust a position of the flight body 1 based on luminance of an image of the marker 3 acquired by the imaging unit 18. The position adjustment unit 23 performs adjustment of a position of the flight body 1 to make the luminance of the marker 3 in the image reach a maximum value. In this case, the position adjustment unit 23 can easily perform the adjustment of the position by simple processing of making the luminance of the marker 3 in the image reach a maximum value without need of performing complex calculation and the like.

An angle equal to or less than the threshold includes an angle that is perpendicular to the main surface 4a. In this case, when the main surface 4a is perpendicularly irradiated with light from the light source 17, luminance of the light control layer 4 in the image also increases.

The movable body is the flight body 1, and the light source 17 emits light in a direction perpendicular to a horizontal plane FP of the flight body 1. In this case, the position adjustment unit 23 easily performs the adjustment of the position such that the horizontal surface FP of the flight body 1 and the main surface of the marker 3 are parallel.

The position detection system 100 further includes a position adjustment unit 23 configured to adjust a position of the flight body 1 based on luminance of an image of the marker 3 acquired by the imaging unit 18. The position adjustment unit 23 determines whether to land the flight body 1 in flight based on the luminance of the marker 3. In this case, the position adjustment unit 23 is capable of easily determining whether landing is possible based on the luminance of the marker 3 in the image without need of performing complex calculation or the like.

The position detection method according to the present embodiment is a position detection method for adjusting a position of a flight body 1 moving with respect to a landing location unit AP, the method including the steps of: emitting light from a light source 17 provided in the flight body 1 to a marker 3 provided in the landing location unit AP; acquiring an image including the marker 3; and detecting a position of the flight body 1 with respect to the landing location unit AP based on luminance of an image of the marker 3 acquired; wherein the marker 3 includes a reflective layer 5, and a light control layer 4 provided in the reflective layer 5 and including a main surface 4a, and the light control layer 4 transmits light having an angle of incidence with respect to the main surface 4a being within a predetermined threshold value.

According to this position detection method, the same actions and effects as the position adjustment unit 23 of the position detection system 100 described above can be obtained.

The marker 3 is a marker 3 including a reflective layer 5, and a light control layer 4 provided in the reflective layer 5, wherein the light control layer 4 transmits light having an angle of incidence with respect to the main surface 4a being within a predetermined threshold value, the light control layer 4 includes at least two regions E1, E2, and the threshold values of the two regions are different from each other, and the reflective layer 5 reflects light having passed through the light control layer 4, and luminance of the reflected light is used to detect a position of the marker 3.

According to this marker 3, the same actions and effects as the position detection system 100 described above can be obtained by providing the marker 3 in the landing location unit AP and performing detection of a position and adjustment of a position of the flight body 1.

The present disclosure is not intended to be limited to the embodiments described above.

Figure 15A:
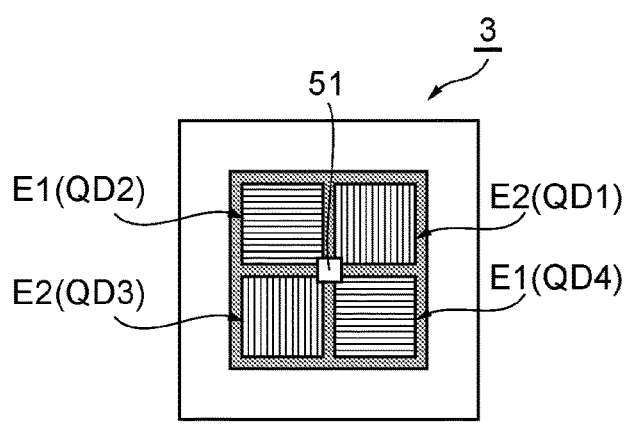
FIGS. 15A to 15F are views illustrating a marker according to a modified example.
Figure 15B:
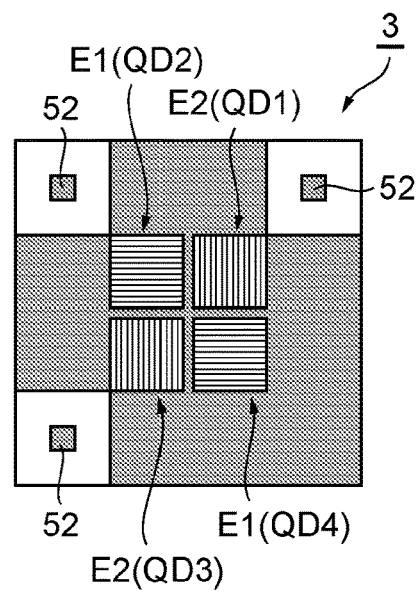
Figure 15C:
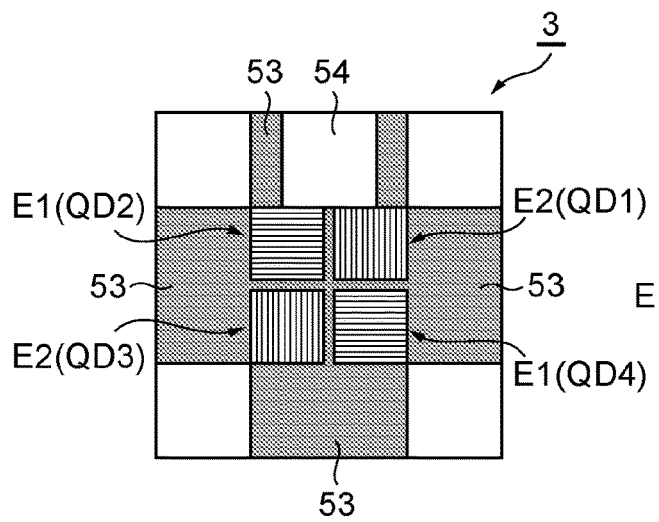
Figure 15D:
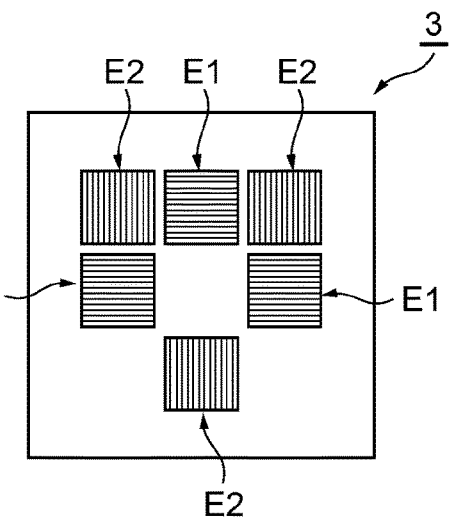
Figure 15E:
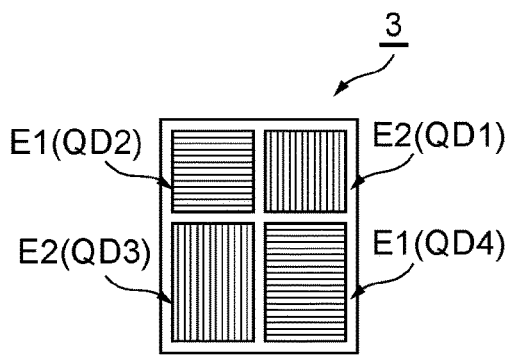

A structure of the marker 3 is not limited to the embodiments described above. For example, a marker according to each of forms as illustrated in FIGS. 15A to 15F may be employed. As illustrated in FIG. 15A, a reflective region 51 having a high reflectance may be formed in a center portion. In this case, when another flight body 1 has already completed the landing, the reflective region 51 becomes in a state of not showing in an image. Accordingly, the flight body 1 preparing for the landing is capable of comprehending that the marker 3 is occupied by another flight body 1.

As illustrated in FIGS. 15B to 15E, the marker 3 may include a structure in which a positional relationship of each quadrant can be comprehended in an image. For example, the marker 3 in FIG. 15B includes an alignment mark 52 at a corner portion. The alignment mark 52 is provided by partially forming a low luminance region in a high luminance region. The alignment mark 52 is not provided at a corner portion on the fourth quadrant QD4 side, but is provided at three other corner portions. The marker 3 in FIG. 15C includes a low luminance region 53 at four edge portions, and includes a high luminance region 54 only in the edge portion of the low luminance region 53 above the first quadrant QD1 and the second quadrant QD2. The marker 3 in FIG. 15D includes a configuration in which the region E1 and the region E2 are alternately disposed in a two row×three column pattern, and only a quadrant in the second row and the second column is shifted downward. The marker 3 in FIG. 15E includes a structure in which the third quadrant QD3 and the fourth quadrant QD4 each have a rectangular shape extending downward. When, as with the marker 3 of each of FIGS. 15B to 15E, a positional relationship between the quadrants can be comprehended in an image, the position detecting unit 22 easily detects a position of the flight body 1 with respect to each quadrant of the marker 3, and the position adjustment unit 23 easily performs the adjustment of the position.

Figure 15F:
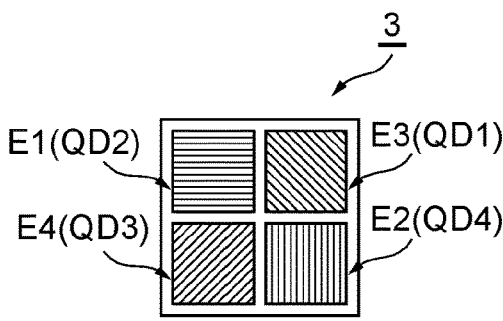

As with the marker 3 illustrated in FIG. 15F, regions E3, E4 with a louver film including an array extending in an oblique direction may be provided, in addition to the region E1 with a louver film including an array extending straight in the lateral direction and the region E2 with a louver film having an array extending straight in the vertical direction.

Figure 16:
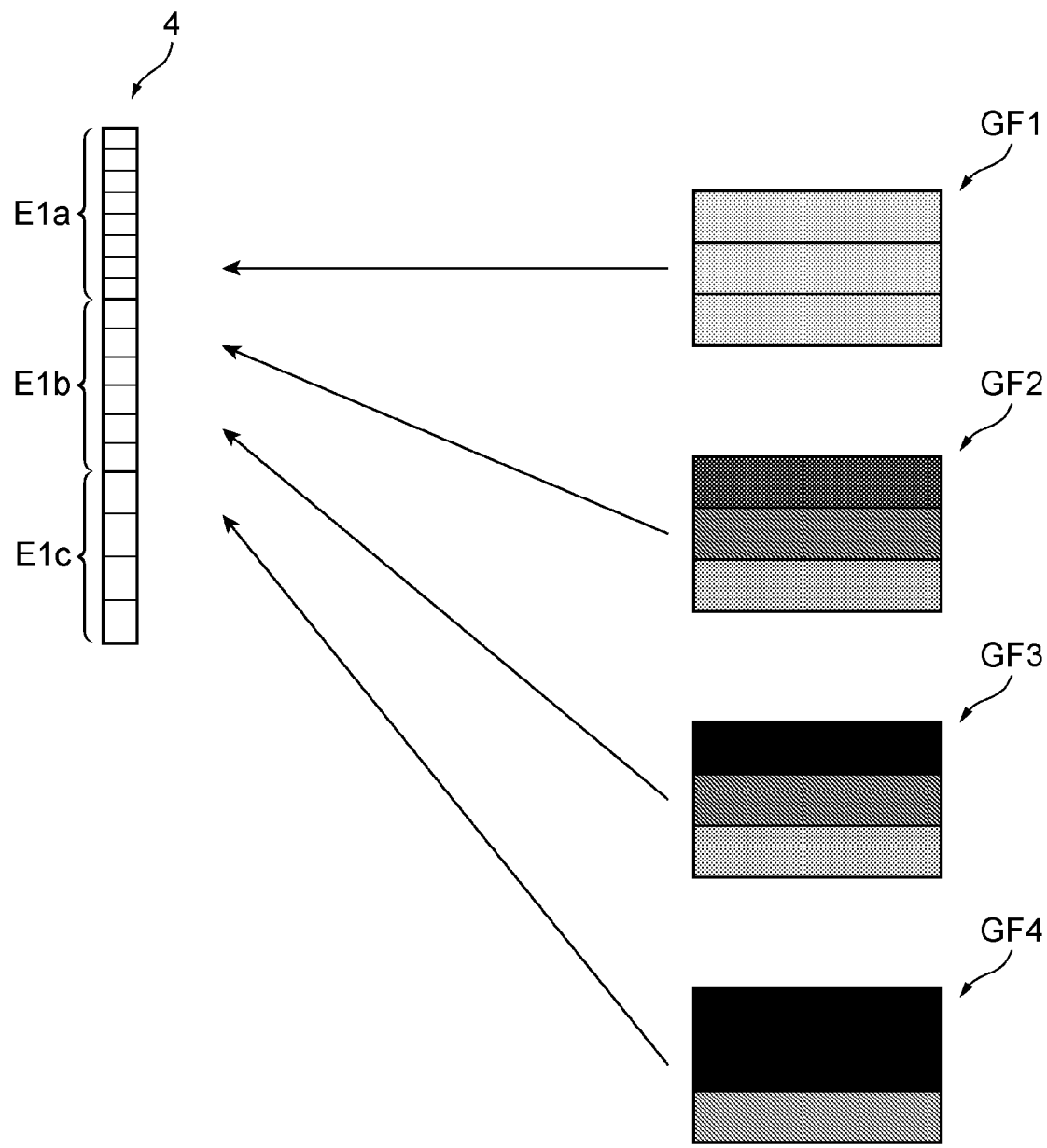
FIG. 16 is a view illustrating a light control layer according to a modified example.

Furthermore, a light control layer 4 illustrated in FIG. 16 may be employed. This light control layer 4 includes three regions E1a, E1b, E1c having different pitches while the directions of the arrays of louver films are the same. A threshold value of an angle of incidence for transmitting light increases in the order of the regions E1a, E1b, E1c. In this case, as illustrated in images GF1 to 4, a difference in luminance of the regions in the images increases as an angle of incidence of the light source 17 (viewing angle of the imaging unit 18) increases. Accordingly, the position detecting unit 22 easily comprehends the degree of shift of the flight body 1 with respect to the marker 3.

Figure 17A:
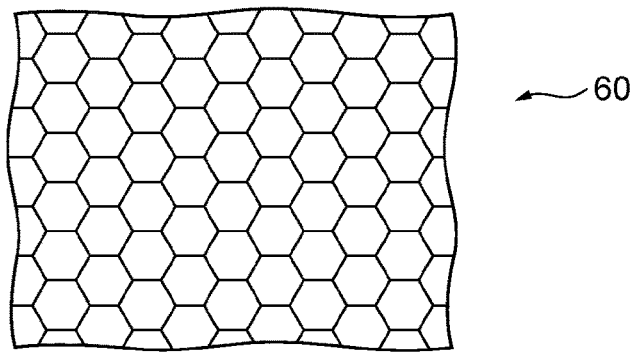
FIGS. 17A to 17C are views illustrating a light control layer according to a modified example.
Figure 17B:
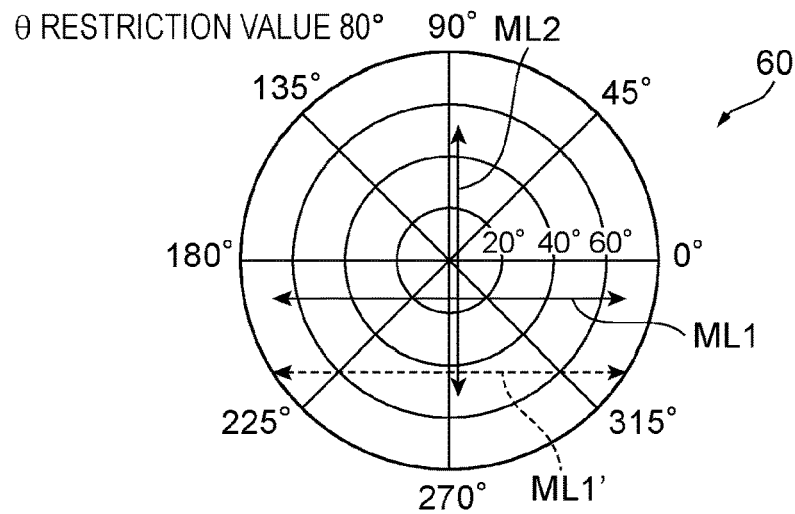
Figure 17C:
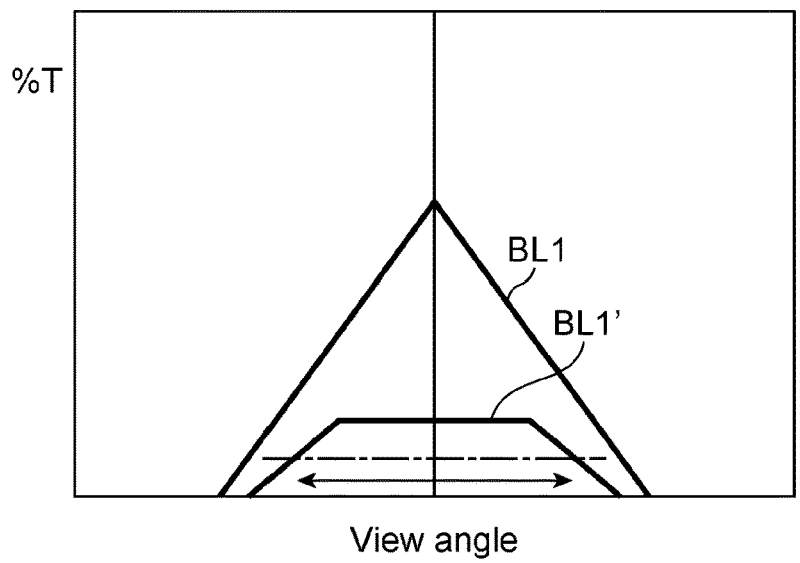

Furthermore, a light control layer 60 illustrated in FIGS. 17A to 17C may be employed. As illustrated in FIG. 17A, the light control layer 60 includes a grid-like louver film. As such a light control layer 60, for example, a member described in JP 2017-522598 T is used. In the light control layer 60 illustrated in FIG. 17B, reflection luminance forms concentric circular intensity distribution, and the closer to the center, the higher the luminance. For example, the position adjustment unit 23 linearly moves the flight body 1 along a movement position ML1. At this time, since reflection luminance is as illustrated in a graph BL1 in FIG. 17C, the position adjustment unit 23 identifies a position at which the reflection luminance is maximum. The position adjustment unit 23 linearly moves the flight body 1 along a movement position ML2 in the vertical direction from such a position, and identifies a position at which the reflection luminance is maximum. Accordingly, the flight body 1 is disposed directly above a center position of the marker. Note that when a movement position ML1' is greatly shifted from the center, the reflection luminance changes smoothly as in a graph BL of FIG. 17C. In this case, the position adjustment unit 23 regards a center point of rising positions of edge portions of both ends of the graph BL as a position at which the luminance reflection is maximum.

Figure 18A:
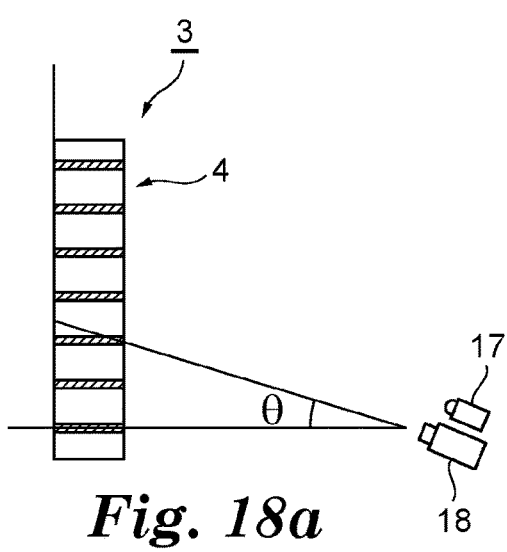
FIGS. 18A to 18D are views for explaining measurement of a vibration frequency and inclination.
Figure 18B:
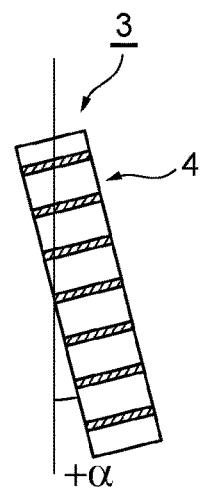
Figure 18C:
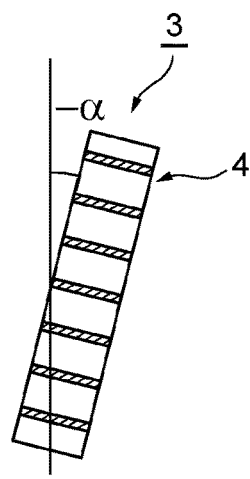
Figure 18D:
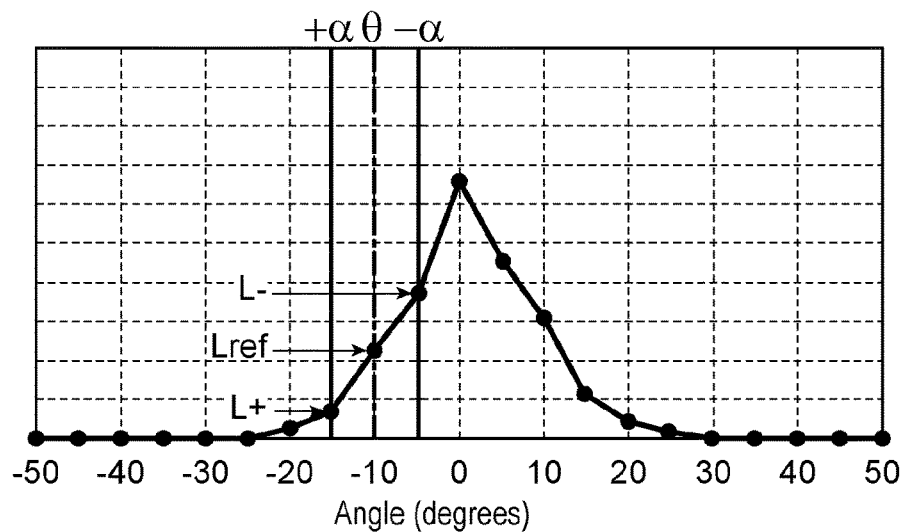

Furthermore, the position detection system of the present embodiment may be used for measurement of a vibration frequency and inclination. As illustrated in FIG. 18A, when an object provided with the marker 3 tilts with respect to the light source 17 and the imaging unit 18 set at an angle of incidence θ (see FIGS. 18B and 18C), a louver angle of the light control layer 4 also changes. As a result, reflection intensity changes in accordance with the louver angle (see FIG. 18D). Accordingly, the position detection system continuously measures reflection intensity, and thus a relative angle of the object with respect to the imaging unit 18 can be detected, and vibration measurement can be performed. Namely, the position detection system is capable of detecting vibration of the object based on a time-series change of an angle. Note that in the figures, a retroreflective sheet is omitted.

Figure 19A:
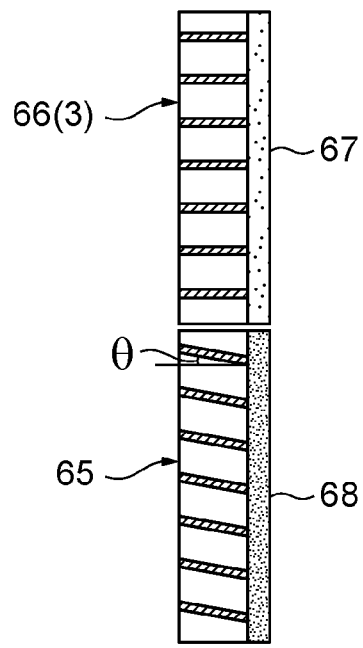
FIGS. 19A and 19B are views for explaining measurement of a vibration frequency and inclination.

To perform the measurement, change in reflection intensity with respect to an angle needs to be linear, and thus observation needs to be performed at a desired angle of incidence. For example, there is a problem of not being able to comprehend a direction of inclination when an angle of incidence is 0°. As the countermeasure, as illustrated in FIG. 19A, a guide sheet 65 including a louver having an inclination of a reference angle θ is disposed at a position adjacent to a detection sheet 66. To separate reflected light for the detection sheet 66 as the marker 3 and reflected light for the guide sheet 65 configured to set an angle of incidence, a light source 17A of visible light and a light source 17B of IR light are prepared as two types of light sources having different wavelengths. Furthermore, an imaging unit 18A of visible light and an imaging unit 18B of IR light are prepared. A filter (light absorbing layer) configured to select light is applied to a surface of each sheet. In the example illustrated in FIGS. 19A and 19B, a filter 67 configured to absorb visible light is provided in the detection sheet 66 and irradiation with visible light is performed. Then, an angle of incidence at which reflection intensity is strongest is determined from the guide sheet 65, and the imaging unit 18 and the light source 17 are fixed. A filter 68 configured to absorb IR light is provided in the guide sheet 65, irradiation with IR light from the light source 17B is performed in that state, and inclination or a vibration frequency of a target TG is measured (see FIG. 19B).

Figure 20:
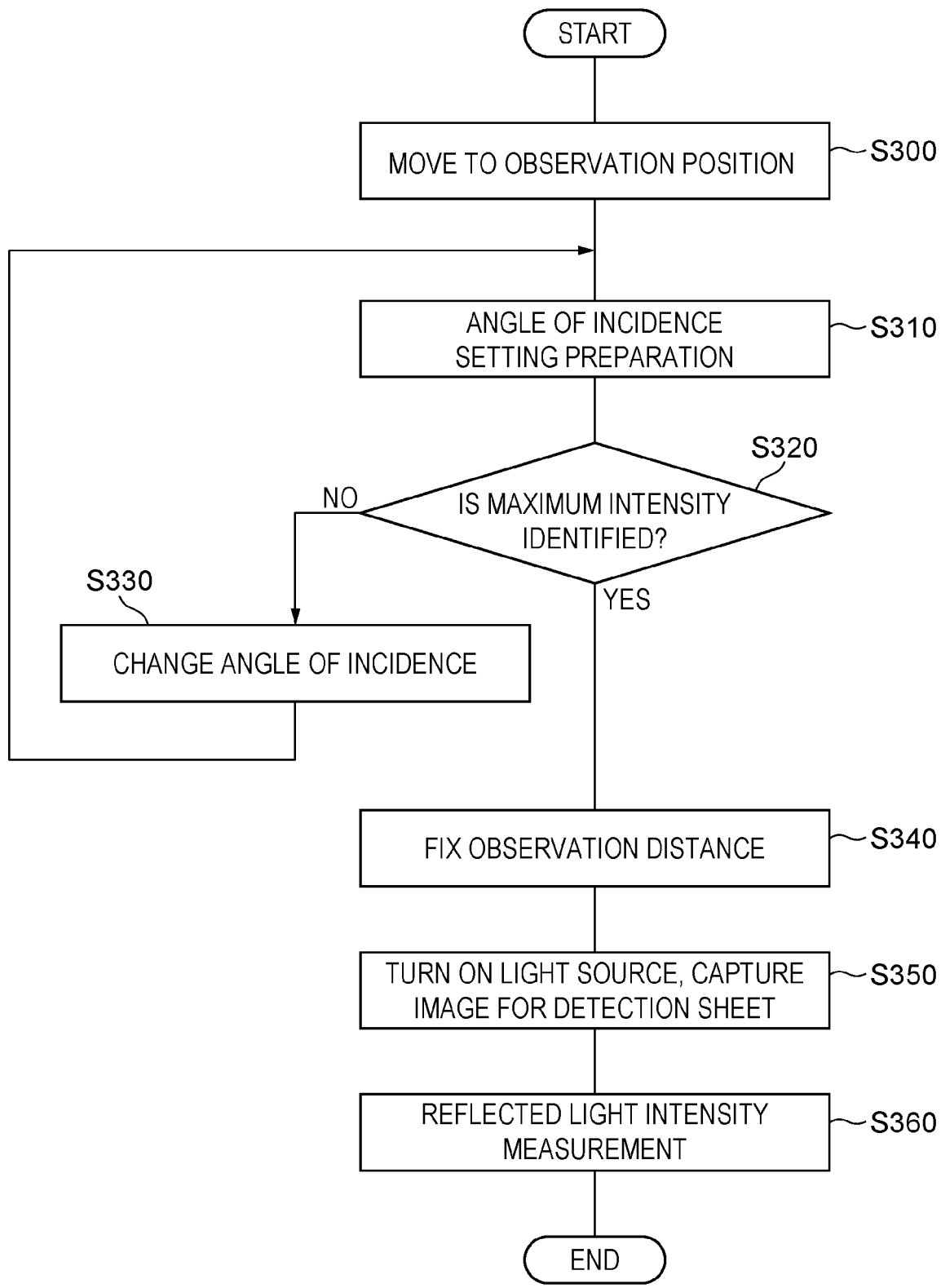
FIG. 20 is a flowchart illustrating a procedure for measurement of a vibration frequency and inclination.

The details of processing of the measurement of a vibration frequency and inclination by the position detection system will be described with reference to FIG. 20. First, the target TG is moved to an observation position (step S300). Next, preparation to set an angle of incidence is performed as illustrated in FIG. 19A (step S310). Next, determination is performed as to whether maximum intensity has been identified (step S320). When the maximum intensity cannot be identified, the angle of incidence is changed (step S330) and the processing is repeated from step S310. When the maximum intensity is identified, an observation distance for each device is fixed (step S340). Next, the detection sheet 66 is irradiated with IR light from the light source 17B, and an image of the detection sheet 66 is captured by the imaging unit 18 (step S350). Then, measurement of a vibration frequency and inclination of the target TG is performed by performing reflected light intensity measurement (step S360).

This angle detection method is an angle detection method for detecting a relative angle (of a light source and an imaging unit) with respect to a target TG, the method including the steps of emitting light from a light source 17B to a marker 3 provided in the target TG, acquiring an image including the marker 3; and detecting a relative angle with respect to the target TG based on luminance of the image of the marker 3 acquired, wherein the marker 3 includes a reflective layer 5, and a light control layer 4 provided in the reflective layer 5, and the light control layer 4 transmits light having a predetermined angle of incidence with respect to a main surface 4a.

According to this angle detection method, the measurement of a vibration frequency and inclination can be performed by simple work of capturing and observing the marker 3 by providing the marker 3 in the target TG without using a device such as a device that emits a special electromagnetic wave.

Figure 19B:
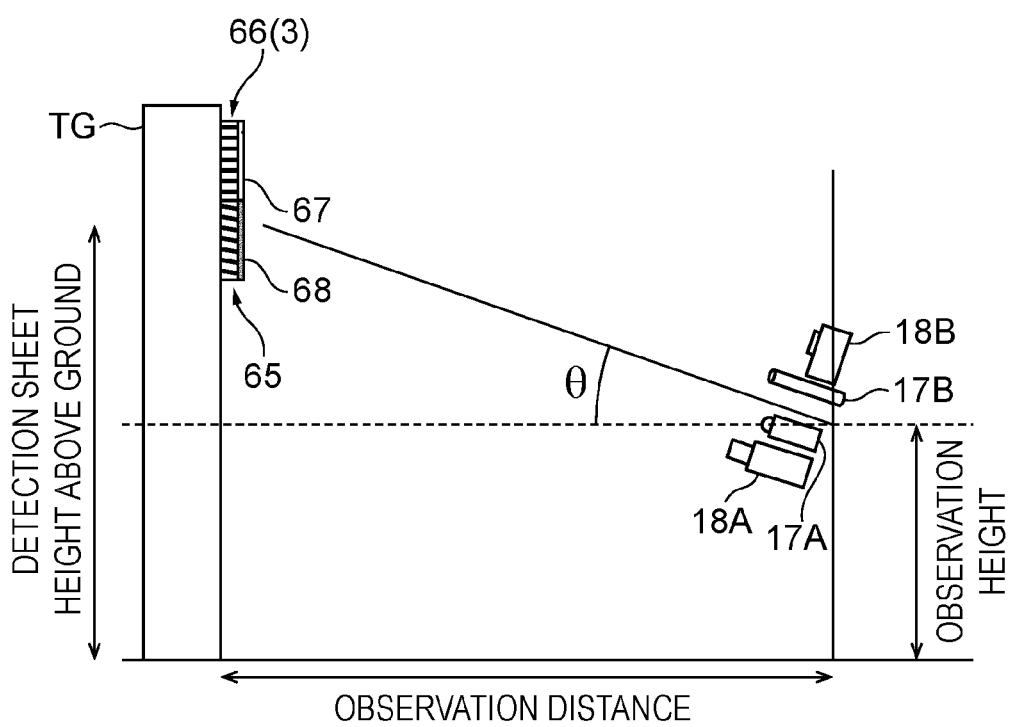
Figure 21A:
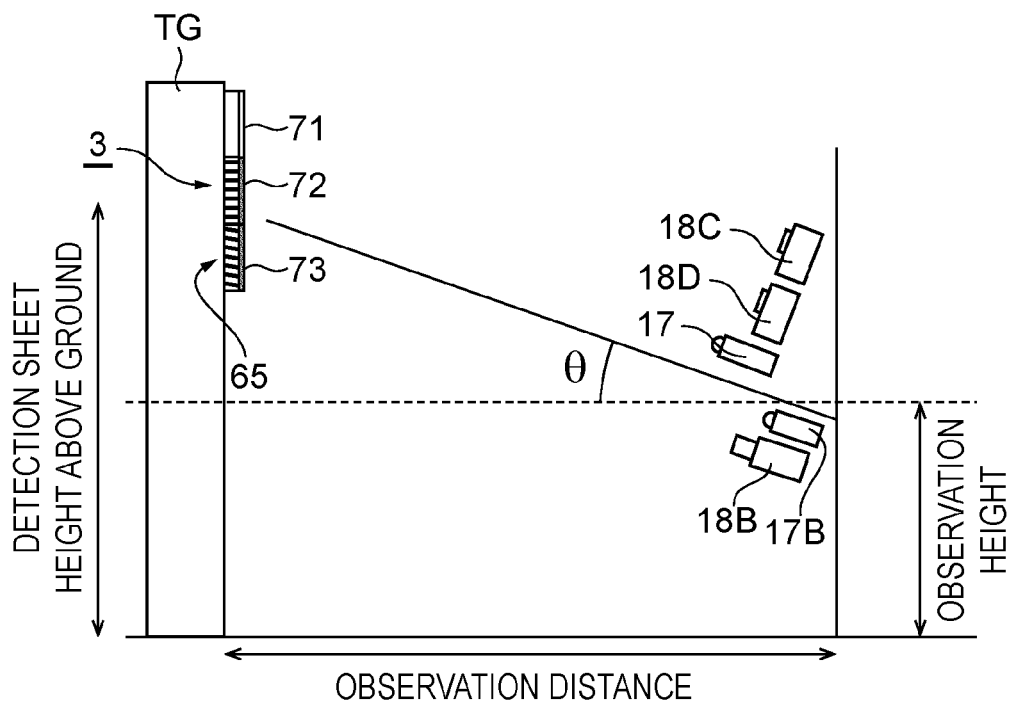
FIGS. 21A and 21B are views for explaining measurement of a vibration frequency and inclination.
Figure 21B:
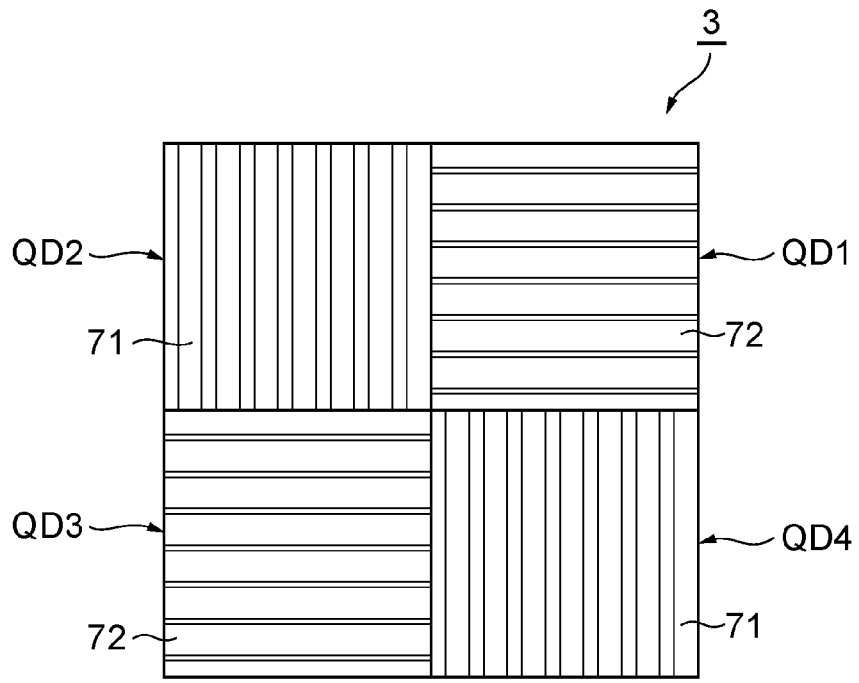

Furthermore, as illustrated in FIGS. 21A and 21B, the measurement of a vibration frequency and inclination as described above may be performed in two axes. The marker 3 here includes four quadrants QD1 to QD4. In the second quadrant OD2 and the fourth quadrant QD4, a louver having an angle θ similar to the guide sheet 65 of FIGS. 19A and 19B is disposed in a vertical direction, and a blue bandpass filter 71 is provided in a front face. In the first quadrant OD1 and the third quadrant QD3, a 90° louver is disposed in a horizontal direction, and a red bandpass filter 72 is provided in the front face. As with the single axis measurement illustrated in FIGS. 19A and 19B, the guide sheet 65 is used to determine a desired angle of incidence with respect to the vertical direction. At this time, a filter 73 configured to transmit IR light only and absorb visible light is provided in a front face of the guide sheet 65. In this way, the light source 17 of visible light for measurement, a detector 18C provided with a red bandpass filter, and a detector 18D provided with a blue bandpass filter are fixed at an angle θ.

As a result, the position detection system is capable of simultaneously measuring a tilt angle in the vertical direction and a tilt angle in the lateral direction by measuring output by the detectors 18C, 18D.

Furthermore, the position detection system of the present embodiment can also be used when the flight body 1 irradiates a target object with laser light. For example, it has been proposed to mount a sensor for monitoring deterioration progress of a social infrastructure such as a bridge and for detecting damage due to an earthquake and the like, but how to supply the sensor with a power source for a long time has been a problem.

Figure 22A:
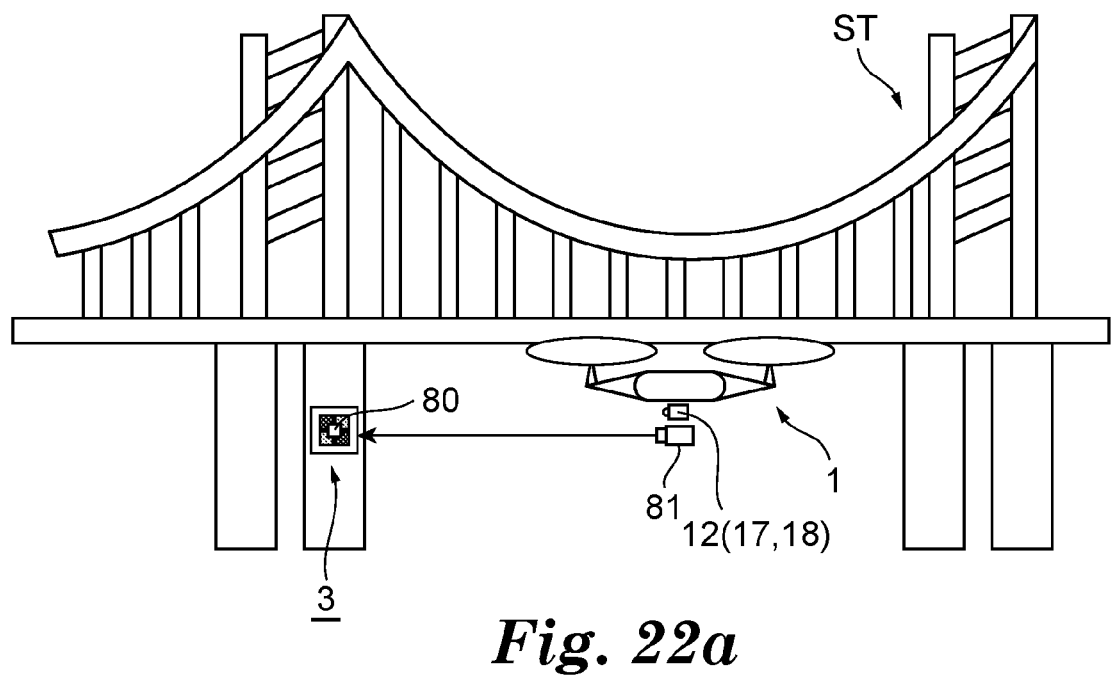
FIGS. 22A and 22B are views illustrating other examples of use of a marker.
Figure 22B:
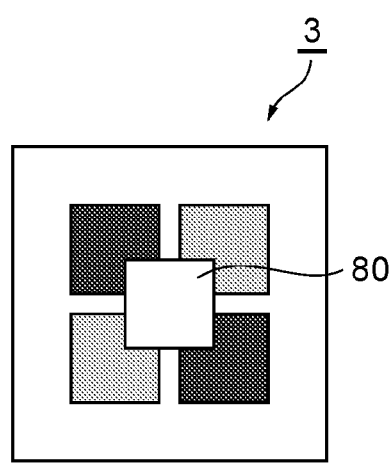

For this problem, a solar cell 80 is disposed at the center of the marker 3 according to the embodiments described above, as illustrated in FIG. 22B. Then, as illustrated in FIG. 22A, the marker 3 is provided at a predetermined position of a structure ST (stationary body) that is a stationary body. Then, a normal direction of the solar cell 80 and the flight body 1 is identified by the same method as the method for landing the flight body 1 described in the embodiment of FIG. 1. Next, the flight body 1 irradiates with laser light from a laser device 81 at a wavelength at which conversion efficiency of the solar cell 80 increases, to generate and feed power to the sensor connected to the solar cell 80.

In the embodiments described above, the marker is provided in the landing location unit and the light source and the imaging unit are provided in the moving body, but the marker may be provided in the moving body and the light source and the imaging unit may be provided in the landing location unit.

REFERENCE SIGNS LIST

1 . . . Flight body (moving body), 3 . . . Marker, 4, 60 . . . Light control layer, 5 . . . Reflective layer, 17 . . . Light source, 18 . . . Imaging unit, 22 . . . Position detecting unit, 23 . . . Position adjustment unit, AP . . . Landing location unit (stationary body), TG . . . Target (stationary body), ST . . . Structure (stationary body), and FP . . . Horizontal plane.

What is claimed is:

1. A position detection system for detecting a position of a movable body moving with respect to a stationary body, the position detection system comprising:
a light source provided in one of the stationary body and the movable body;
an imaging unit provided in one of the stationary body and the movable body;
a marker provided in one of the stationary body and the movable body different than the one of the stationary body and the movable body in which the light source was provided; and
a position detecting unit configured to detect a position of the movable body with respect to the stationary body based on luminance of an image of the marker acquired by the imaging unit;
wherein the marker includes a reflective layer, and a light control layer provided in the reflective layer and including a main surface, and
the light control layer comprises a louver film which transmits light having an angle of incidence with respect to the main surface being within a predetermined threshold value.

2. The position detection system according to claim 1, further comprising a position adjustment unit configured to adjust a position of the movable body based on luminance of an image of the marker acquired by the imaging unit.

3. The position detection system according to claim 1, wherein the light control layer includes at least two regions, each region transmitting light having an angle of incidence with respect to the main surface within a predetermined threshold value, and wherein the predetermined threshold values of the two regions are different from each other.

4. The position detection system according to claim 3, further comprising a position adjustment unit configured to adjust a position of the movable body based on luminance of an image of the marker acquired by the imaging unit, the image of the marker including an image of the at least two regions, wherein the position adjustment unit adjusts a position of the movable body to make a difference in luminance between the two regions, as determined from the image of the at least two regions, smaller.

5. The position detection system according to claim 1, further comprising a position adjustment unit configured to adjust a position of the movable body based on luminance of an image of the marker acquired by the imaging unit, wherein the position adjustment unit adjusts a position of the movable body to make luminance of the marker in the image reach a maximum value.

6. The position detection system according to claim 1, wherein an angle having the threshold value or less includes an angle perpendicular to the main surface.

7. The position detection system according to claim 1, wherein the movable body is a flight body, and the light source emits light in a direction perpendicular to a horizontal plane of the flight body.

8. The position detection system according to claim 1, further comprising a position adjustment unit configured to adjust a position of the movable body based on luminance of an image of the marker acquired by the imaging unit, wherein the position adjustment unit determines whether to land the movable body based on luminance of the marker.

9. A position detection method for adjusting a position of a movable body moving with respect to a stationary body, the method comprising the steps of:
emitting light from a light source provided in one of the stationary body and the movable body to a marker provided in the other of the stationary body and the movable body;
acquiring an image including the marker; and
detecting a position of the movable body with respect to the stationary body based on luminance of an image of the marker acquired;
wherein the marker includes a reflective layer, and a light control layer provided in the reflective layer and including a main surface, and
the light control layer comprises a louver film and transmits light having an angle of incidence with respect to the main surface being within a predetermined threshold value.

10. An angle detection method for detecting a relative angle with respect to a target, the method comprising the steps of:
emitting light from a light source to a marker provided in the target;
acquiring an image including the marker; and
detecting the relative angle with respect to the target based on luminance of an image of the marker acquired;
wherein the marker includes a reflective layer, and a light control layer provided in the reflective layer and including a main surface, and
the light control layer comprises a louver film and transmits light having a predetermined angle of incidence with respect to the main surface.

11. A marker comprising:
a reflective layer; and
a light control layer provided in the reflective layer comprising a louver film and including a main surface, wherein
the light control layer includes at least two regions, each of the at least two regions transmitting light having an angle of incidence with respect to the main surface within a predetermined threshold value, each region of the at least two regions having a different predetermined threshold value, and
the reflective layer reflects light having passed through the light control layer, and luminance of the reflected light is used to detect a position of the marker.

12. A position detection system for detecting a position of a movable body moving with respect to a stationary body, the position detection system comprising:
a light source provided in one of the stationary body and the movable body;
an imaging unit provided in one of the stationary body and the movable body;
a marker provided in one of the stationary body and the movable body different than the one of the stationary body and the movable body in which the light source was provided;
a position detecting unit configured to detect a position of the movable body with respect to the stationary body based on luminance of an image of the marker acquired by the imaging unit; and
a position adjustment unit configured to adjust a position of the movable body based on luminance of an image of the marker acquired by the imaging unit, wherein the position adjustment unit adjusts a position of the movable body to make luminance of the marker in the image reach a maximum value;
wherein the marker includes a reflective layer, and a light control layer provided in the reflective layer and including a main surface, and
the light control layer transmits light having an angle of incidence with respect to the main surface being within a predetermined threshold value.

13. An angle detection method for detecting a relative angle with respect to a target, the method comprising the steps of:
emitting light from a light source to a marker provided in the target;
acquiring an image including the marker; and
detecting the relative angle with respect to the target based on luminance of an image of the marker acquired;
wherein the marker includes a reflective layer, and a light control layer provided in the reflective layer and including a main surface,
the light control layer transmits light having a predetermined angle of incidence with respect to the main surface; and
vibration of the target is detected based on a time-series change of an angle.

* * * * *